(12) United States Patent
Samsøe et al.

(10) Patent No.: US 10,047,462 B2
(45) Date of Patent: Aug. 14, 2018

(54) REUSE OF TEXTILE WASTE

(71) Applicant: Really ApS, Frederiksberg (DK)

(72) Inventors: Klaus Samsøe, Copenhagen Ø (DK);
Wickie Meier Engström, Frederiksberg (DK)

(73) Assignee: REALLY APS, Frederiksberg (DK)

( * ) Notice: Subject to any disclaimer, the term of this patent is extended or adjusted under 35 U.S.C. 154(b) by 242 days.

(21) Appl. No.: 14/914,512

(22) PCT Filed: Sep. 25, 2014

(86) PCT No.: PCT/IB2014/064834
§ 371 (c)(1),
(2) Date: Feb. 25, 2016

(87) PCT Pub. No.: WO2015/044894
PCT Pub. Date: Apr. 2, 2015

(65) Prior Publication Data
US 2016/0215421 A1 Jul. 28, 2016

(30) Foreign Application Priority Data

Sep. 25, 2013 (WO) .................. PCT/IB2013/058846

(51) Int. Cl.
*D04H 1/02* (2006.01)
*D04H 1/58* (2012.01)
(Continued)

(52) U.S. Cl.
CPC .............. *D04H 1/02* (2013.01); *B29C 70/12* (2013.01); *B29C 70/46* (2013.01); *D04H 1/4274* (2013.01);
(Continued)

(58) Field of Classification Search
None
See application file for complete search history.

(56) References Cited

U.S. PATENT DOCUMENTS 3,978,179 A 8/1976 Sundhauss
4,029,839 A * 6/1977 Lesti .................. B29B 17/0042
428/317.9
(Continued)

FOREIGN PATENT DOCUMENTS

WO WO 01/32405 A1 5/2001
WO WO 2010/063079 A1 6/2010
WO WO 2011/068399 A1 6/2011

OTHER PUBLICATIONS

International Search Report, issued in PCT/1132014/064834, PCT/ISA/210, dated Feb. 2, 2015.
(Continued)

*Primary Examiner* — Mary Lynn F Theisen
(74) *Attorney, Agent, or Firm* — Birch, Stewart, Kolasch & Birch, LLP

(57) ABSTRACT

The invention pertains to a method of manufacturing a product from textile waste comprising a majority of cotton or wool, the method comprising the steps of; collecting the textile waste comprising; a majority of cotton or wool, granulating said, textile waste into fibers having an average fiber length of between 0.5 mm and 4 mm, mixing said granulated textile waste with thermoplastic binder, and forming a nonwoven mat from the mixture of said granulated textile waste and binder. Preferably the method further comprises the steps of placing said: mat in a preheated three-dimension mold or flat press, and pressing the mat into a product having a shape determined: by the shape of the three-dimensional mold or flat press. The invention also pertains to a product produced by said method.

40 Claims, 9 Drawing Sheets

(51) Int. Cl.
*D04H 1/54* (2012.01)
*D04H 1/4274* (2012.01)
*B29C 70/12* (2006.01)
*B29K 105/26* (2006.01)
*B29C 70/46* (2006.01)
*B29K 311/10* (2006.01)
*B29K 105/12* (2006.01)

(52) U.S. Cl.
CPC ............... *D04H 1/54* (2013.01); *D04H 1/58* (2013.01); *B29K 2023/06* (2013.01); *B29K 2105/12* (2013.01); *B29K 2105/26* (2013.01); *B29K 2311/10* (2013.01); *B29K 2995/006* (2013.01)

(56) References Cited

U.S. PATENT DOCUMENTS

| | | | | |
|---|---|---|---|---|
| 5,257,831 | A * | 11/1993 | Garcia | D01G 11/04 19/82 |
| 5,783,505 | A | 7/1998 | Duckett et al. | |
| 7,918,952 | B1 * | 4/2011 | Young | B29B 17/0036 156/153 |
| 2004/0176003 | A1 * | 9/2004 | Yang | C03C 25/24 442/120 |
| 2004/0242108 | A1 * | 12/2004 | Russell | A01G 1/002 442/414 |
| 2008/0115330 | A1 * | 5/2008 | Pinto | D01G 11/00 19/65 R |
| 2013/0005209 | A1 * | 1/2013 | Andersen | D04H 1/4266 442/353 |

OTHER PUBLICATIONS

Kamath et al. "Cotton Fiber Nonwovens for Automotive Composites", International Nonwovens Journals (INJ), Jun. 30, 2005, pp. 34-40.

Prachayawarakorn et al. "Effect of Cotton Fiber Contents and Lengths on Properties of Thermoplastic Starch Composites Prepared from Rice and Waxy Rice Starches", J. Polym. Environ., Mar. 1, 2011, vol. 19, No. 1, pp. 274-282.

Written Opinion of International Preliminary Examining Authority issued in PCT/IB2014/064834, PCT/IPEA/408, dated Sep. 1, 2015.

Written Opinion of International Preliminary Report on Patentability issued in PCT/IB2014/064834, PCT/IPEA/409, dated Jan. 7, 2016.

Written Opinion of the International Searching Authority, issued in PCT/IB2014/064834, PCT/ISA/237, dated Feb. 2, 2015.

* cited by examiner

REUSE OF TEXTILE WASTE

TECHNICAL FIELD

The present invention pertains to a method of manufacturing products from textile waste, in particular textile waste comprising a majority of vegetable or animal fibers, in particular cotton or wool. The present invention also pertains to a product manufactured according to the inventive method.

BACKGROUND OF THE INVENTION

The textile industry disposes of a substantial amount of mostly woven or knitted waste fabric material which is accumulated from various stages of the manufacturing process, such as trimmings, end pieces, faulty sections, experimental pieces and rejected pieces. At the present time, practically none of these waste materials is reclaimed or reused, because there has been no satisfactory method of reclaiming or reusing them. Rather, they are disposed of in refuse dumps or by chemical or physical means, and as so disposed, they constitute environmental pollutants. Furthermore, a large portion of marketed fabric materials, e.g. apparel, household textiles such as towels tablecloths and spreadsheets, and textiles from industrial laundries, which are ultimately discarded as waste and pollutants, would be suitable for reuse if a practical method of reprocessing or reclaiming these materials were available, but no such method is presently available.

Prior art document WO2010063079 discloses a method of forming nonwoven material, the method comprising receiving fibrous material comprising thermoplastic fibers, processing the fibrous material to produce short fibers, adding the short fibers to a preformed web, and heating and optionally compressing the preformed web to form a nonwoven material. The fibrous material concerned is off-cuts and processing wastes of mainly synthetic textile production, not recycled clothing or used textile products.

Prior art document WO0132405 discloses a method of forming a fibre reinforced thermoplastic composite sheet by sourcing waste fibrous material and waste thermoplastic material, producing a flock of the fibrous material and mixing the flock with the thermoplastic material before heating and pressing the mix to form the fibre reinforced thermoplastic composite sheet.

SUMMARY OF THE INVENTION

It is thus an object of the present invention to provide a method of reusing waste textiles.

It is a further object of the invention to provide a product manufactured by waste textiles.

According to the present invention, the above-mentioned and other objects are fulfilled by 1. A method of manufacturing a product from textile waste comprising at least 70% of vegetable or animal fibres, in particular cotton or wool, the method comprising the steps of:
 collecting the textile waste,
 granulating the textile waste into fibers having an average fiber length of between 0.5 mm and 4 mm,
 mixing the granulated textile waste with a thermoplastic binder, and
 forming a nonwoven mat from the mixture of the granulated textile waste and the binder.

The nonwoven mat may define a product which may for example be used for insulation or as an acoustic board.

Hereby is achieved a method by which textile waste is transformed into useful products instead of being placed in a landfill or incinerated in a refuse incineration plant, as is customary praxis today.

The use of previously woven or knitted textile waste such as used textile (clothes, bed sheets and the like) is in contrast to the above cited prior art.

The textile waste is typically sourced from only-cotton or only-wool used textiles. Waste cotton textiles are more readily available and cheaper than waste wool textiles, however wool is the technically better fiber because the interbinding properties of wool fibers are better than cotton. Further wool fibers are more water resistant and more fire resistant than cotton.

Accordingly in some embodiments cotton fibers obtained from granulating cotton waste textiles and wool fibers obtained from granulating wool waste textiles are mixed to obtain a good balance between properties and cost.

The fiber length of 0.5 to 4 mm is important for several reasons as will be seen below.

In a preferred embodiment of the present invention the method further comprises the steps of:
 placing the mat in a preheated three-dimensional mould or a flat press, and
 pressing the mat into a product having a shape determined by the shape of the three-dimensional mould or the flat press.

By granulating the textile waste to an average fiber length of between 0.5 mm and 4 mm it is possible to form a nonwoven mat having a very fine and homogenous structure, thereby making it possible to press it into shaped products having a high degree of finish. By a thermoplastic binder is meant a binder which can be melted and flow upon heating, and which will re-set upon cooling. This heating and cooling procedure can be repeated.

In a preferred embodiment of the method according to the invention, the step of pressing the mat into a product having a shape determined by the shape of the three-dimensional mould or flat press comprises the substep of heating the nonwoven mat to a temperature beyond the melting temperature of the thermoplastic binder.

In a preferred embodiment of the method according to the invention the collected textile waste comprises woven or knitted textile waste selected from any of: trimmings, end pieces, faulty sections, experimental pieces and rejected pieces from the textile industry, used textiles, used clothes, used bed linens, or used curtains.

The textile waste may in some embodiments contain 80 to 100% woven or knitted textile waste. The textile waste may comprise mixtures of different types of fibers such as for example 90% cotton/10% polyester, 95% cotton/5% lycra, 80% cotton/20% acryl, 90% wool/10% acryl, 70% wool 30% viscose, and 85% wool/15% polyacryl etc.

In a further embodiment of the method according to the present invention the collected textile waste comprises any of at least a piece of a non-woven mat formed by the method according the present invention, or at least a piece of a product manufactured by the method according to the present invention.

This is advantageous as it provide a closed loop reuse system where virtually no material is lost. A product manufactured by the method according to the present invention may be recycled, and made into new products, many times. Specifically the thermoplastic binder already in the product or nonwoven mat may be reused. However, preferably about 5% by weight of thermoplastic binder is added.

Additionally, fibers from the granulation of woven or knitted textile waste, or fibres from other textile waste, may be added.

If products or nonwoven mats comprising different types of fibers are used the resulting product will have a mottled appearance.

The pieces of nonwoven mats and/or the products may for example be collected from nonwoven mats produced during start, cessation or errors of performing the method according to the present invention. Further post processing such as cutting of nonwoven mats and products yields parts of nonwoven mats and product which may be collected.

Specifically a product manufactured according to the present invention may be used as the textile waste for manufacturing a new product using the method.

Thus in one scenario the method according to the present invention is used to manufacture (1) a table top of a table. This table is sold to a first consumer in a furniture store, which customer after a period of use discards the table. The table may be discarded at a recycling station or otherwise collected and the table top is separated from the other table components. The table top may then be used as the textile waste for manufacturing (2) a MDF-like plate according to the method of the present invention. This MDF-like plate may be sold in a hardware store to a second customer who may use the MDF-like plate for building a cupboard. This cupboard may then, as with the table top, be discarded and used as the textile waste for manufacturing yet another, and another, product in a closed cycle with little or no loss of material.

Where the textile waste comprises pieces of nonwoven mats or products manufactured by the method according to the present invention the textile waste may be granulated by a hammer mill.

In a preferred embodiment of the method according to the present invention:
the step of forming the nonwoven mat comprises the substeps of
forming a plurality of nonwoven mats from the mixture of the granulated textile waste and binder, and
arranging the plurality of nonwoven mats on top of each other to form the nonwoven mat.

This is advantageous as it allows thicker products to be manufactured from a plurality of thinner nonwoven mats.

As the nonwoven mat is pressed and heated in the three-dimensional mould or flat press, the thermoplastic binder melts and bonds the plurality of nonwoven mats together.

To obtain optimum interfacial bonding between the plurality of nonwoven mats the textile waste should be granulated to fibers having an average length of 0.5 mm to 2 mm.

In a refinement of the above embodiment to the method according to the present invention:
the step of collecting the textile waste comprises the substep of:
collecting a plurality of different types of textile waste,
the step of granulating the textile waste comprises the substep of:
granulating each of the plurality of different types of textile waste,
the step of mixing the granulated textile waste comprises the substep of:
mixing each of the types of granulated textile waste with a thermoplastic binder, and wherein at least two of the plurality of nonwoven mats are formed from different types of granulated textile waste mixed with the thermoplastic binder.

This is advantageous as it allows for forming products which have comprise fibers from different types of textile waste in different parts of the products. This may for example be used to produce a product having a thick middle layer of fibers from cotton-containing textile waste, which may further be randomly coloured, flanked by thinner layers of fibers from wool-containing textile waste, which may be mono-coloured, thus reducing the amount of wool-containing textile waste needed to manufacture the product. Such a product may for example comprise 87% cotton and 13% wool.

Thus different layers, i.e. each of the plurality of nonwoven mats may have different colours, comprise different types of fibers from different types of textile waste etc. A product in the shape of a plate may for example comprises a plurality of layers. Such a product may be used for a table top or counter top where the layers are visible at the edge of the table to or counter top for providing an aesthetic effect.

In a further refinement of any of the above two embodiments at least one of the plurality of nonwoven mats is pressed separately before being arranged with the other mats of the plurality of nonwoven mats.

This is advantageous as it gives the different nonwoven mats different densities. The nonwoven mat pressed separately is preferably pressed at a higher pressure than the pressure used for pressing the nonwoven mat made up of the plurality of nonwoven mats.

This allows for manufacturing products having a lightly pressed middle layer having a low density between two highly pressed outer layers having high density. Such a products has a lower weight.

The above further refinement of the method is especially advantageous for manufacturing acoustic sheets or tiles whereby a first nonwoven mat may be pressed at high pressure so as to reduce the thickness of the unpressed nonwoven mat with about 90%, such as from 40-50 mm unpressed to 3-5 mm pressed, whereafter a plurality of mats are arranged on the first mats and the arranged mats pressed together to a thickness of 22-32 mm.

Alternatively each mat may be pressed separately with different pressures whereafter the pressed mats are arranged together and bonded to each other using heat.

The acoustic sheet or tile produced as detailed above has one hard side and an opposite softer sound absorbing side. Such an acoustic sheet or tile may be used on walls or ceilings and may additionally be used in as a table top for a table with the hard side up and the sound absorbing side down.

Optionally two or more layers of glass fibre weave/fabric or carbon fibre weave/fabric may be arranged as reinforcement between the layers. Each one of the two or more layers should be arranged as close as possible to a corresponding surface of the nonwoven mat or product.

In one embodiment of the method according to the present invention:
the step of collecting the textile waste comprises the substep of:
collecting a plurality of different types of textile waste having different appearances,
the step of granulating the textile waste comprises the substep of:
granulating each of the plurality of different types of textile waste,
the step of mixing the granulated textile waste comprises the substep of:

mixing each of the types of granulated textile waste with a thermoplastic binder, and wherein the step of forming the nonwoven mat comprises the substeps of:

forming a nonwoven mat from each of the types of granulated textile waste mixed with the thermoplastic binder, arranging portions of the nonwoven mats edge to edge for forming said nonwoven mat having a pattern defined by the portions, and wherein the method further comprises the step of:

forcing the portions of the nonwoven mats together edge to edge during the pressing of the nonwoven mat.

This is advantageous as it provides a use for smaller lots of textile waste. The nonwoven mat when pressed assumes a tile like appearance having a pleasing decorative effect and can be used for example on walls in a kitchen. The portions of the mats may have different shapes and sizes and may further be arranged in other patterns to form symbols or writing.

The different appearance of the different types of textile waste may be due to different colours or different types of fibers used to form the textile waste.

In one embodiment one or more of the types of granulated textile waste mixed with the thermoplastic binder may be used to form a non-woven base mat upon which the portions of the nonwowen mats are arranged. During the pressing of the nonwoven mat the portions adhere to the base mat and each other as the thermoplastic binder is melted by the heat from the preheated three-dimensional mould or flat press.

In a further refinement of the above embodiment a nonwoven frame mat defining a central aperture for receiving the portions of the nonwoven mats arranged edge to edge with each is produced from the same type of textile waste as the base mat or any of the other types of waste textile. The nonwoven frame part is then arranged on the nonwoven base mat prior to arranging the portions of the nonwoven mats on the nonwoven base mat.

This is advantageous as it simplifies the manufacture of the product by simplifying arranging the portions and by preventing movement of the portions during pressing.

In a first alternative embodiment of the method according to the present invention the textile waste comprises a mix of wool and cotton, a mix of different wools, and/or a mix of different cottons.

In a second alternative embodiment of the method according to the present invention, the step of collecting the textile waste comprises the substeps of:
collecting a first amount of textile waste comprising a majority of cotton, and
collecting a second amount of textile waste comprising a majority of wool,
and:
the step of granulating the textile waste comprises the substeps of:
granulating each of the first and second amounts of textile waste into fibers having an average fiber length of between 0.5 mm and 4 mm, and
mixing the first and second amounts of granulated textile waste.

These two alternative embodiments are advantageous as they extend the more rare and more expensive wool containing textile waste using the more common and cheaper cotton containing waste.

Typically the ratio between wool and cotton in the product will be 50% wool and 50% cotton, however the ratio may vary such as 90/10, 40/60, 60/40, 10/90, etc percent wool vs. percent cotton.

Adding the wool to the cotton provides a fire preventive effect associated with the wool.

The products manufactured by these mixes of wool and cotton, or cotton/cotton or wool/wool, have better properties than cotton only products, see example 2-2. These products further have a mottled appearance which suggests that these products could be used as a substitute for marble and other stones.

In some embodiments of the method according to the present invention the method further comprises the step of:
mixing the granulated textile waste with a wetting agent such as maleic anhydride polypropylene.

This is advantageous as it increases resistance against swelling caused by exposure to moisture and as it increases bond strength between fibers and thermoplastic binder Preferably the amount of wetting agent added to the granulated textile waste is 2% by weight.

In some embodiments of the method according to the present invention the method further comprises the step of:
mixing the granulated textile waste with glass fibers.

This is advantageous as it reinforces the product, see example 2-8, and further increases fire resistance.

Preferably the glass fiber is second generation, i.e. recycled, glass fibers. The amount of glass fibres added to the granulated textile waste is 3% by weight.

In a preferred embodiment of the method according present invention 50% to 90% of the thermoplastic binder is made up of a recycled polyethylene plastic.

This is advantageous as it reduces the need for virgin thermoplastic binder which thermoplastic binder often comprises virgin, i.e. non-recycled, plastic.

Further the inclusion of recycled polyethylene is beneficial for increasing resistance against swelling caused by exposure to moisture, see example 2-2.

Recycled polyethylene plastic is a black powder or granulate traditionally used for rotation moulding. As the recycled polyethylene is sourced from all types of polyethylene product having different colours it is commonly colored black by addition of black colorant. Thus the product manufactured by this preferred embodiment of the method according to the present invention has a mottled appearance caused by the black polyethylene plastic. This results in a product which may for example be used as a substitute for stone and which therefore may be used for counter tops and table tops. The use of recycled polyethylene further reduces the cost of manufacturing the product because it is cheaper than virgin thermoplastic binder.

The inventors have further surprisingly found that granulated textile waste mixed with a thermoplastic binder made up in part by recycled polyethylene may be formed by air laying.

In some embodiments of the present invention the method further comprises the step of:
positioning a plastic film between the mat and the three-dimensional mould or flat press prior to the pressing.

This is advantageous as it provides a coating on the product, which coating provides the product with a uniform smooth surface. The plastic film may be provided on one or more sides of the product. By using a coloured plastic film the appearance of the product may be changed.

The plastic film may be polylactic acid (PLA) or polyethylene (PE) plastic.

In some embodiments of the present invention the method further comprises the step of:

coating the product with a wax, oil or lacquer.

This is advantageous as it provides the surface of the product with a uniform smooth surface. Further coating, especially when coating with a lacquer, protects the product against swelling caused by exposure to moisture, see example 2-6.

As an alternative, the product, when made from textile waste comprising wool, may be coated with lanolin.

It has surprisingly been found that the surface of the products may be printed because it is can be made smooth and hard by pressing with sufficient force. Thus in one embodiment of the method according to the present invention the method further comprises the step of:

affixing a print, preferably through silk screen printing, to the product.

This is advantageous as it allows different aesthetic expressions for increasing usability of the product as well as it increases the possibilities for using the product manufactured by the method according to the present invention as a substitute for other materials.

It has turned out to be advantageous to granulate smaller pieces of textile waste in commercially available granulators and hammer mills, because the granulating runs more smoothly without production stops. Accordingly, a further preferred embodiment of the method according to the invention may further comprise the step of cutting the collected textile waste into pieces having a maximal length of 30 cm and a maximal width of 30 cm, before commencing the step of granulating said textile waste.

According to a further preferred embodiment of the method according to the invention, the granulated textile fibers have an average length of between 0.5 mm and 3 mm, preferably an average length of between 0.5 mm and 2 mm.

Possible fiber average fiber lengths include an average length of between 0.7 mm and 2 mm, between 0.7 mm and 1.5 mm, or between 0.8 mm and 1.2 mm. Investigations have shown that good results may be achieved with an average fiber size of approximately 1 mm. Accordingly, in one embodiment of the method according to the invention, the textile waste is granulated to a size of approximately 1 mm with a low spreading around 1 mm. By a low spreading is meant a deviation of less than 10%20% from 1 mm.

Preferably all of the fibers have lengths between 0.5 and 4 mm, such as between 0.5 and 3 mm and such as between 0.5 and 2 mm.

The fibers need to be short and to have a low spreading in order to result in a more homogenous material which therefore can be pressed harder to obtain a higher density and a smoother surface. Furthermore short fibers with a low spreading result in a better distribution of the thermoplastic binder. Short fibers also increase the interfacial bonding "internal bond" between different nonwoven mats in a sandwich product cf. Example 2-2.

Also when cutting the product the short fibers with low spreading yield a cleaner cut. This is in contrast to prior art techniques where a shredder is used to form fibers because the fibers formed by a shredder are longer and less homogenous. A shredder uses a rotating steel cylinder bearing knives for granulating textile waste fibers with a wide spread of different average lengths. In the prior art such fibers are useful for spinning new thread for weaving or knitting, or for being used as stuffing in pillows.

In a further embodiment of the method according to the invention, the step of mixing the textile fibers with the binder may comprise the substep of mixing said textile fibers and the binder in a ratio such that the binder will constitute between 10% and 30% weight of the finished mixture. The amount (and type) of binder used may be conveniently chosen in dependence of what kind of product is to be produced by the method according to the invention. For example if hard plates suitable for replacing osb plates or plywood plates are to be produced, then a larger proportion of binder is to be used than that which is necessary in order to produce different products. The amount and type of binders added will thus depend on the intended use of the final product.

In a further preferred embodiment of the method according the invention, the binder may comprise fibers of thermoplastic, i.e. plastics that melts at asset temperature and then resets upon cooling. The binders may also be provided in the form of synthetic fibers, for example bi-component fibers consisting of polypropylene and polyethylene, polyester, vinyl etc. In such a situation the nonwoven mat is formed by heating up to the melting temperature of the plastic, whereby inter-fibre bonds (between the textile fibers) are established.

In order to provide optimal inter-fibre bonds, the fibers of thermoplastics may according to a further embodiment of the inventive method have an average length between 1 mm and 15 mm, preferably between 3 mm and 12 mm.

In a further preferred embodiment of the method according to the invention, the fibers of thermoplastic are at least in part manufactured from reused plastics. Hereby is achieved that a product is produced by the method according to the invention is a 100% recycled product, because only waste materials, which otherwise would have been disposed with at a landfill or in a refuse incineration plant, are used as start materials.

In a further preferred embodiment of the method according to the invention, the fibers of thermoplastic are manufactured from renewable natural resources. Hereby is achieved a carbon dioxide neutral product, because both the waste textile fibers, which are majorly or substantially 100% cotton fibers, and the thermoplastic is produced from renewable natural recourses.

In a further embodiment of the method according to the invention, the fibers of thermoplastic are manufactured from biodegradable plastics. Hereby is achieved a much more environmentally friendly solution is achieved, where the end product produced by the inventive method is a "cradle to cradle" product, i.e. a product which will in a natural way become part of the biological environment from which it is formed. It is understood that by the word biodegradable it is meant degradable by a biological process, e.g. anaerobic or aerobic bacterial breakdown of the product.

The biodegradable binder may in an embodiment be any of the following materials: bio-epoxy, polyhydroxyalkanoates, polylactic acid, polybutylene succinate, polycaprolactone, polyanhydrides, and polyvinyl alcohol.

In order to provide an optimal tradeoff between price, and quality of the end products produced by the inventive method, each of the plastic fibers may in a further embodiment comprise a mix of biodegradable plastic and conventional plastic. In order to provide an optimal tradeoff between price, quality and environmental friendliness of the end products produced by the inventive method said mix of biodegradable plastic and conventional plastic may in a further embodiment be a mix, where the biodegradable plastic constitutes at least 70% per weight of said mix.

In order to provide an optimal tradeoff between price, and quality of the end products produced by the inventive method, the plastic fibers may in a further embodiment comprise a mix of fibers made from biodegradable plastic and of fibers made from conventional plastic. In order to provide an optimal tradeoff between price, quality and environmental friendliness of the end products produced by the inventive method said mix may in a further embodiment comprise at least 70% per weight of fibers made from biodegradable plastic and the remainder being fibers made from conventional plastic.

In a preferred embodiment of the method according to the invention, each of the plastic fibers may comprise a core formed by a first type of plastic and a cladding surrounding the core, which cladding is formed by a second type of plastic, said first type of plastic having a significantly higher melting point than said second type of plastic. Hereby it is possible to form a nonwoven mat by heating the mix of textile fibers and plastic fibers up to and preferably slightly beyond the melting temperature of the second type of plastic (but not up to the melting temperature of the first type of plastic). This first heating step will cause the cladding to melt and form inter-fibre bonds between the individual textile fibers, whereby a coherent mat similar to rock or stone wool is produced. Such a coherent nonwoven mat is easy to handle and place in the matched three-dimensional mould or flat press before commencing the pressing step. During the pressing step the nonwoven mat is heated to, or preferably beyond, the melting temperature of the first type of plastic, which constitutes the core of the plastic fibers. Hence the core of the plastic fibers will melt during this pressing step and the melted plastic fibers will, when cured, form a matrix embedding the textile fibers.

In a further embodiment of the method according to the invention, the first type of plastic may have a melting point, which is between 30 degrees Celsius and 80 degrees Celsius higher than the melting point of the second type of plastic, preferably between 50 degrees Celsius and 70 degrees Celsius higher than the melting point of the second type of plastic. Because of the great differences in the melting temperatures of the first and second types of plastics, it is hereby achieved a method, which is practically implementable without great risk of overheating (and thereby melting) the core plastics of the plastic fibers during the step of forming the nonwoven mat of textile fibers.

In a further embodiment of the method according to the invention, the first type of plastic has a melting point of between 100 degrees Celsius and 140 degrees Celsius. Hence, the step of forming the nonwoven mat may in a further embodiment of the inventive method comprise the substep of heating the mixture of plastic fibers and granulated textile waste fibers to a temperature of between 100 degrees Celsius and degrees Celsius.

In a further embodiment of the method according to the invention, the second type of plastic has a melting point of between 150 degrees Celsius and 200 degrees Celsius. Hence, in a further embodiment according to the invention, the step of pressing the nonwoven mat in the preheated matched three-dimensional mould or flat press may comprise the substep of heating the nonwoven mat to a temperature between 150 degrees Celsius and 200 degrees Celsius during the step of pressing the mat into the desired shape.

The nonwoven mat is preferably formed in a dry airborne process, which makes it possible to make the fibre mat with greater or lesser degree of compacting and with greater or lesser thickness. It will thus be possible to make the fibre mats with thicknesses from 2-5 mm up to thicknesses of 2-300 mm or even thicker. The density of the manufactures nonwoven fibre mats is in one embodiment 30 grams per cubic meters to 3000 grams per cubic meters or more.

In one embodiment agents imparting to the mat fire retardant properties may be added. Such agents may comprise any of: borax, boric acid, aluminium hydroxide, diammonium phosphate, ammonium polyphosphate, ammonium sulphate or others.

In one embodiment the pressing is performed at a temperature between 160 to 200° C. at a pressure of 40-100 ton/m$^2$ for 5-15 minutes. The pressing may further comprise lowering the temperature to below the melting temperature of the thermoplastic binder and allowing the thermoplastic binder to set while pressing. Thus the total time (including cooling time) may be more than 15 minutes.

In a further embodiment of the method according to the invention, the substep of dry forming the mats may comprise blowing the mix of fibers and binder into a forming head disposed above a forming wire, prior to or simultaneously to heating said mixture. In this forming head a number of rollers and spikes aid in disintegrating the textile fibers in order to provide an even distribution of them, when settling on the forming wire, whereby a nonwoven mat having a homogenous and isotropic density distribution.

A further embodiment of the method according to the invention may further comprise the substep of plowing said mixture of fibers and binder into a forming head placed above a vacuum box disposed on the forming wire, where the mixture of fibers and binder is deposited and held by a vacuum.

In the preferred embodiment of the method according to the present invention the nonwoven mat is formed using air laying.

This is advantageous as it allows for forming nonwoven mats having a higher density, and which nonwoven mats may therefore be compressed more to achieve a higher 20-40% higher density in the manufactured product than product manufactured from nonwoven mats formed by other techniques than air laying. Increasing the density leads to stronger products, and where the product is a plate also to a thinner plate which requires less space for transport and storage.

According to preferred embodiment of the method according to the present invention the step of granulating the textile waste comprises the substep of processing the textile waste using a rasper and/or fine granulator.

A rasper uses a number or adjustable knives to granulate pieces of textile waste into smaller fractions.

A fine granulator granulates the textile waste down to 0.5-4 mm fibers. Fine granulators are primarily used for granulation of tires, cabling, aluminum and plastics. A fine granulator uses a number of adjustable knives and provides for regulating the average length of the fibers.

Where the textile waste comprises nonwoven mats or products manufactured by the method according to the present invention a hammer mill may be used to granulate the nonwoven mat or product into fibers.

In a further embodiment of the method according to the invention the preheated three-dimensional mould or flat press comprises first and second complimentary shaped mould or press parts for defining the shape.

This is advantageous as it provides for manufacturing three-dimensionally shaped product which, after the mould or flat press has been cooled down, retain their three-dimensional shape after being removed from the mould or flat press.

The above mentioned and further objects are furthermore achieved by a product, which is manufactured by a method mentioned above and/or any of the embodiments of said method—also mentioned above. Said product may in a preferred embodiment be a plate, a board, a household product, or an acoustic sheet or acoustic tile.

BRIEF DESCRIPTION OF THE DRAWINGS

A further understanding of the nature and advantages of the present invention may be realized by reference to the remaining portions of the specification and the drawings. In the following, preferred embodiments of the invention is explained in more detail with reference to the drawings, wherein.

DETAILED DESCRIPTION

Figure 1:
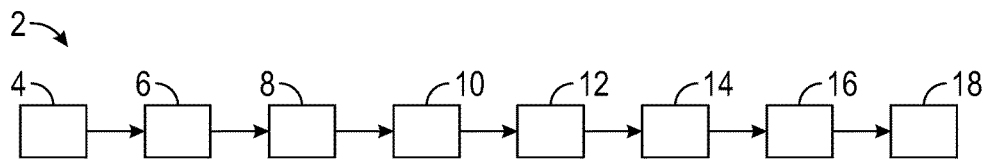
FIG. 1 shows a flow diagram of a preferred embodiment of the method according to the invention.

The present invention will now be described more fully hereinafter with reference to the accompanying drawings, in which exemplary embodiments of the invention are shown. The invention may, however, be embodied in different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout. Like elements will, thus, not be described in detail with respect to the description of each figure.

FIG. 1 shows an embodiment of a flow diagram, wherein the individual steps of an embodiment 2 of a method according to the invention is schematically illustrated. According to the illustrated method 2 a rigid plate is manufactured from the collected textile waste. In the first step 4, textile waste comprising a majority of cotton or wool is collected. This collected textile waste may comprise any of: trimmings, end pieces, faulty sections, experimental pieces and rejected pieces from the textile industry, fluff from dry cleaning, used textiles, e.g. used clothes, used bed linens, or used curtains.

Then in the second step 6, this collected textile waste is cut into pieces having a maximal length of 30 cm and maximal width of 30 cm. This prior cutting of the textile waste eases the subsequent granulation of said textile waste.

Then in the third step 8, the textile waste is granulated into fibers having an average fiber length of approximately 1 mm, preferably with a low spreading around 1 mm. By a low spreading is meant a deviation of less than 10%-20% from 1 mm. The granulation of the textile waste may be performed by commercially available fine granulators.

In the forth step 10, said granulated textile fibers are mixed with a thermoplastic binder in the form of fibers made from thermoplastic, where each of said plastic fibers comprises a core formed by a first type of thermoplastic and a cladding surrounding the core, which cladding is formed by a second type of thermoplastic, said first type of plastic having a significantly higher melting point than said second type of plastic.

In order to provide optimal inter-fibre bonds (between the textile fibers), the fibers of thermoplastics have a length between 3 mm and 12 mm. The step 10 of mixing the textile fibers with the binder may comprise the substep of mixing said textile fibers and the binder in a ratio such that the binder will constitute between 10% and 30% weight of the finished mixture. The amount (and type) of binder used may be conveniently chosen in dependence of what kind of product is to be produced by the method according to the invention.

Examples of binders may be fibers of thermoplastic. The binders may also be provided in the form of synthetic fibers, for example bi-component fibers consisting of polypropylene and polyethylene, polyester, vinyl etc. The fibers of thermoplastic may at least in part be manufactured from reused plastics. Hereby is achieved that a product is produced by the method according to the invention is a 100% recycled product, because only waste materials, which otherwise would have been disposed with at a landfill or in a refuse incineration plant, are used as start materials. The fibers of thermoplastic may also be manufactured from renewable natural recourses, whereby is achieved a carbon dioxide neutral product, because both the waste textile fibers, which are majorly or substantially 100% cotton fibers or wool fibers, and the thermoplastic is produced from renewable natural recourses. The fibers of thermoplastic may also be manufactured from biodegradable plastics, whereby is achieved a much more environmentally friendly solution, where the end product produced by the method 2 is a "cradle to cradle" product, i.e. a product which will in a natural way become part of the biological environment from which it is formed. Here, it is understood that by the word biodegradable it is meant degradable by a biological process, e.g. anaerobic or aerobic bacterial breakdown of the product. The biodegradable plastic fibers may be formed from any of the following materials: bio-epoxy, polyhydroxyalkanoates, polylactic acid, polybutylene succinate, polycaprolactone, polyanhydrides, and polyvinyl alcohol.

However, in order to provide an optimal tradeoff between price, and quality of the end products produced by the method 2, each of the plastic fibers may in a further embodiment comprise a mix of biodegradable plastic and conventional plastic. Said mix of biodegradable plastic and conventional plastic may be a mix, where the biodegradable plastic constitutes at least 70% per weight of said mix. Alternatively, the plastic fibers comprise a mix of fibers made from biodegradable plastic and of fibers made from conventional plastic.

Then in the fifth step 12 a nonwoven mat is formed by heating the mix of textile fibers and plastic fibers up to and preferably slightly beyond the melting temperature of the second type of plastic (but not up to the melting temperature of the first type of plastic). This will cause the cladding of the plastic fibers to melt and form inter-fibre bonds between the individual textile fibers, whereby a coherent mat similar to rock or stone wool is produced. For example if the first type of plastic (which constitutes the cladding of the individual plastic fibers) has a melting point of between 100 degrees Celsius and 140 degrees Celsius, the step 12 of forming the nonwoven mat comprises a heating of the mixture of plastic fibers and granulated textile waste fibers to a temperature of at least between 100 degrees Celsius and 140 degrees Celsius.

The nonwoven mat is preferably formed in a dry airborne process, which makes it possible to make the fibre mat with greater or lesser degree of compacting and with greater or lesser thickness. It will thus be possible to make the fibre mats with thicknesses from 2-5 mm up to thicknesses of 2-300 mm or even thicker. The density of the manufactures nonwoven fibre mats is in one embodiment 30 grams per cubic meters to 3000 grams per cubic meters or more.

Then in the sixth step 14, the nonwoven mat is placed in a preheated three-dimensional mould or flat press.

In the seventh step 16, the nonwoven mat is pressed into a product having a shape determined by the shape of the three-dimensional mould or flat press. During the pressing step 16 the nonwoven mat is heated to, or preferably beyond, the melting temperature of the first type of plastic, which constitutes the core of the plastic fibers.

Hence the core of the plastic fibers will melt during this pressing step and the melted plastic fibers will, when cured, form a matrix embedding the textile fibers. For example if the second type of plastic has a melting point of between 150 degrees Celsius and 200 degrees Celsius, the step 16 of pressing the nonwoven mat in the preheated matched three-dimensional mould or flat press may comprise a heating of the nonwoven mat to a temperature of at least between 150 degrees Celsius and 200 degrees Celsius during the step 16 of pressing the mat into the desired shape, which shape may be a three-dimensional shape of a flat pressed panel.

In the eighth step 18, the product (for example a plate) is removed from the three-dimensional mould or flat press, and excess material is cut and/or trimmed away in order to provide a product having the desired finish.

Figure 9:
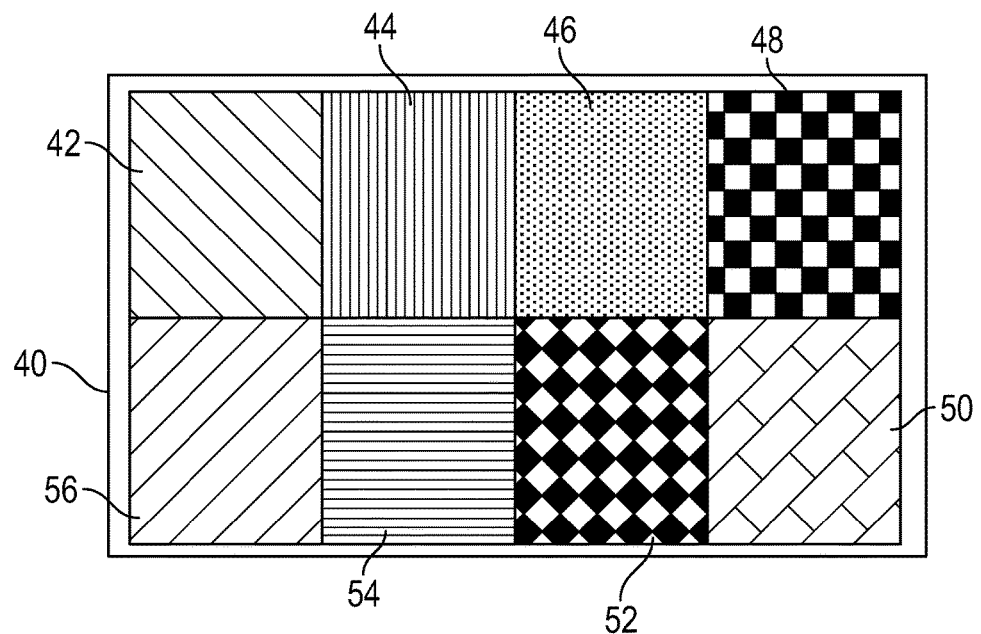
FIG. 9 shows a vertically and horizontally bonded product having a pattern made up of portions of top mats.

FIG. 9 shows a vertically and horizontally bonded product having a pattern made up of portions of mats. A base mat 40 is first formed whereafter first to eighth portions 42, 44, 46, 48, 50, 52, 54, and 56 are taken from mats having different appearances as illustrated by the shading. The portions 42 44 46 48 50 52 54 and 56 are arranged on the base mat 40 before the base mat and portions are pressed and heated.

Figure 10:
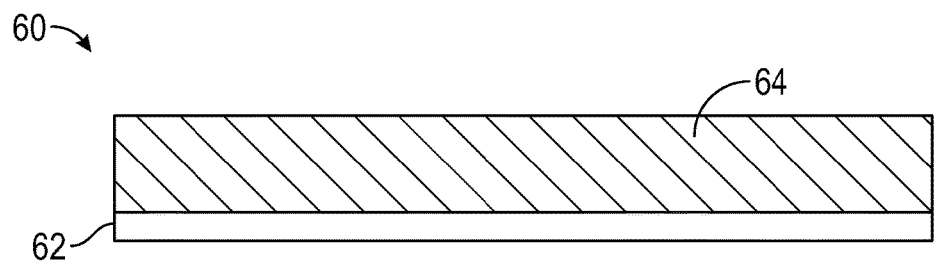
FIG. 10 shows a cross section of an acoustic sheet having a hard layer and a soft sound absorbing layer.

FIG. 10 shows a cross section of an acoustic sheet 60 having a hard layer 62 and a soft sound absorbing layer 64. For manufacturing the acoustic sheet 60 a first nonwoven mat is firstly pressed hard to produce the hard layer 62. Thereafter a second nonwoven mat is placed upon the hard layer 62 and the hard layer 62 and the second nonwoven mat pressed slightly while heated for bonding the second nonwoven mat to the hard layer 62 to form the soft sound absorbing layer 64.

Example 1: Sound Absorption

In the following a series of acoustic tests performed on samples of plates (and nonwoven mats) manufactured in accordance with an embodiment of the inventive method will be discussed. The acoustic tests have been performed by DELTA Akustik. The sound absorption was measured for a sound field having an incidence that is perpendicular to the plates that were examined.

The so called transfer measurement method in accordance with the standard EN ISO 10534-2 was used, where the incidence sound and the reflected sound from a test sample placed in a tube is measured with two microphones. The ratio between these two measurements is characterized by a frequency dependent transfer function. The diameter of the tube implies an upper cutoff frequency, which in this particular setup is 2000 Hz. The measurement accuracy for the complete measurement setup gives a lower cutoff frequency. In the particular system used this lower cutoff frequency is 50 Hz.

Figure 2:
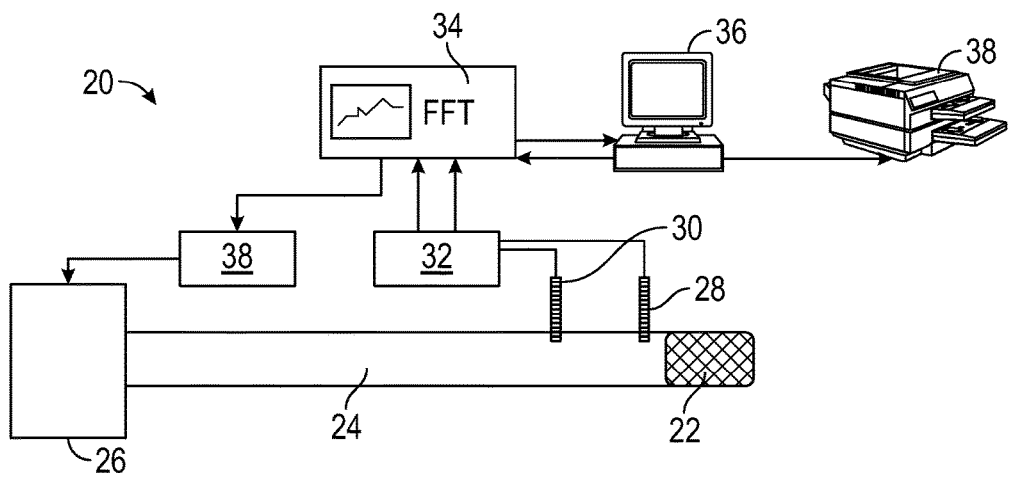
FIG. 2 shows the measurement setup for measuring the absorption coefficient of plates manufactures in accordance with an embodiment of the method according to the invention.
Figure 3:
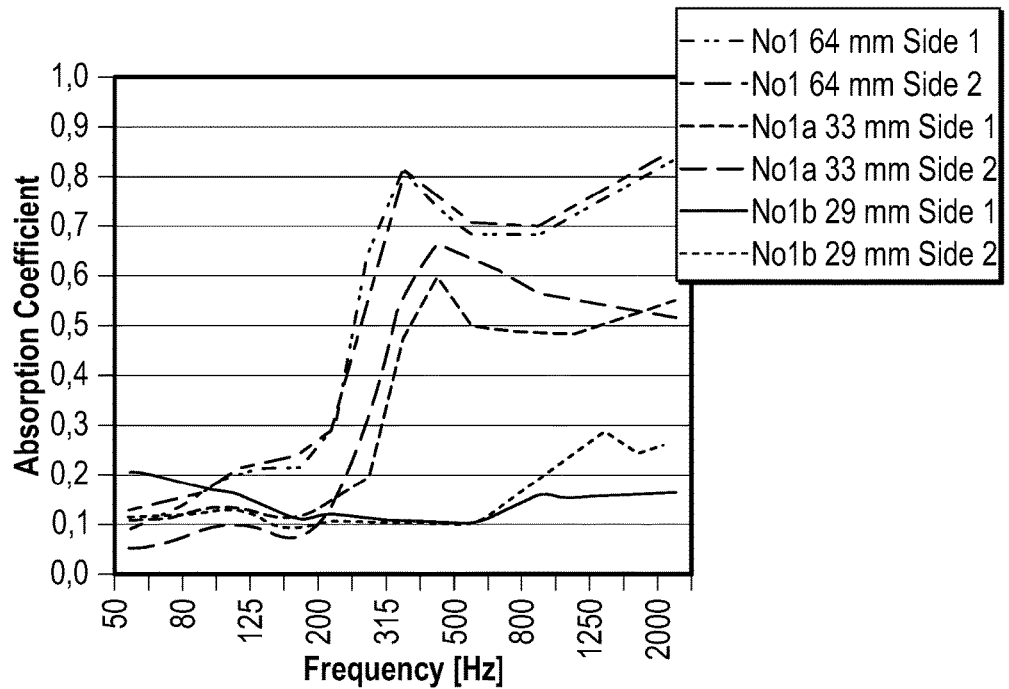
FIGS. 3-8 show the measured absorption coefficient per ⅓ octave for test samples.
Figure 4:
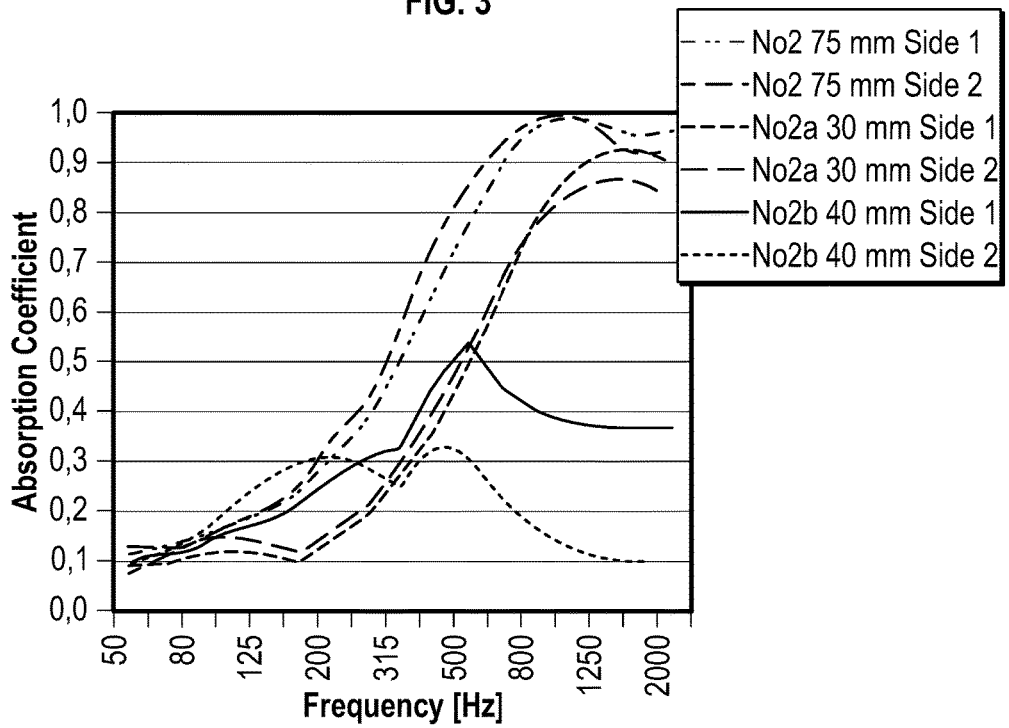
Figure 5:
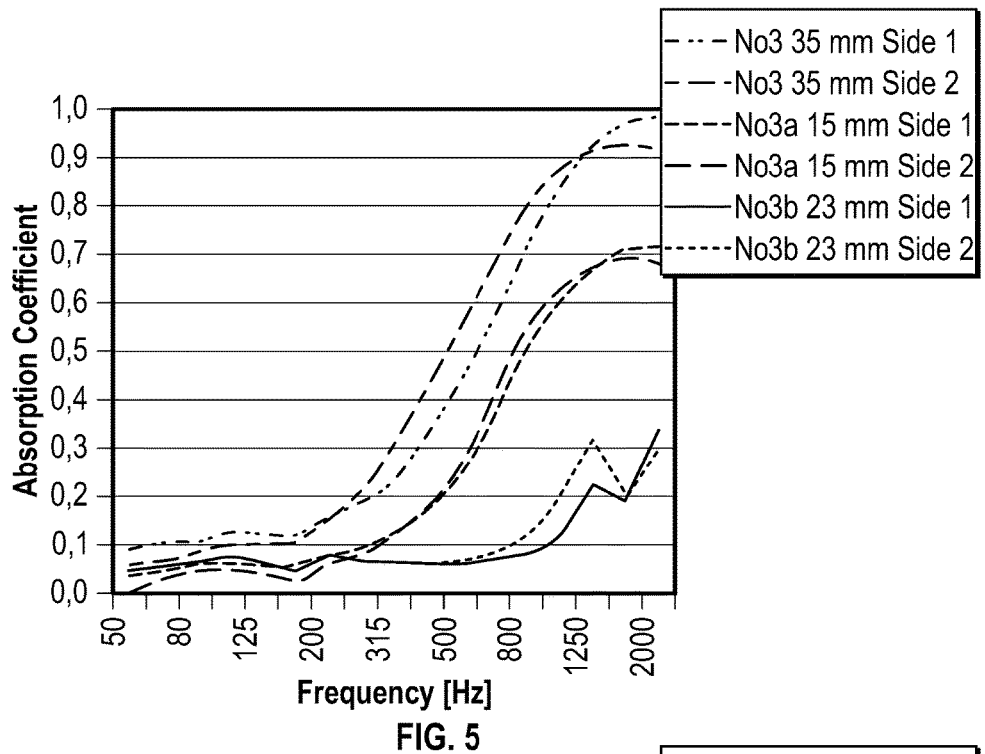
Figure 6:
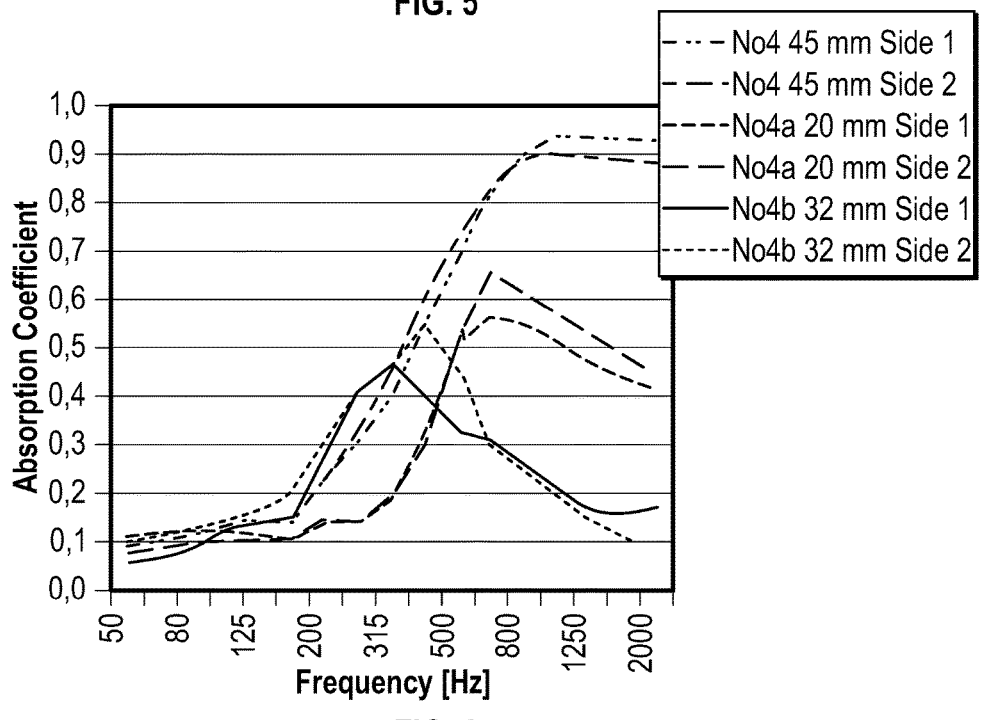
Figure 7:
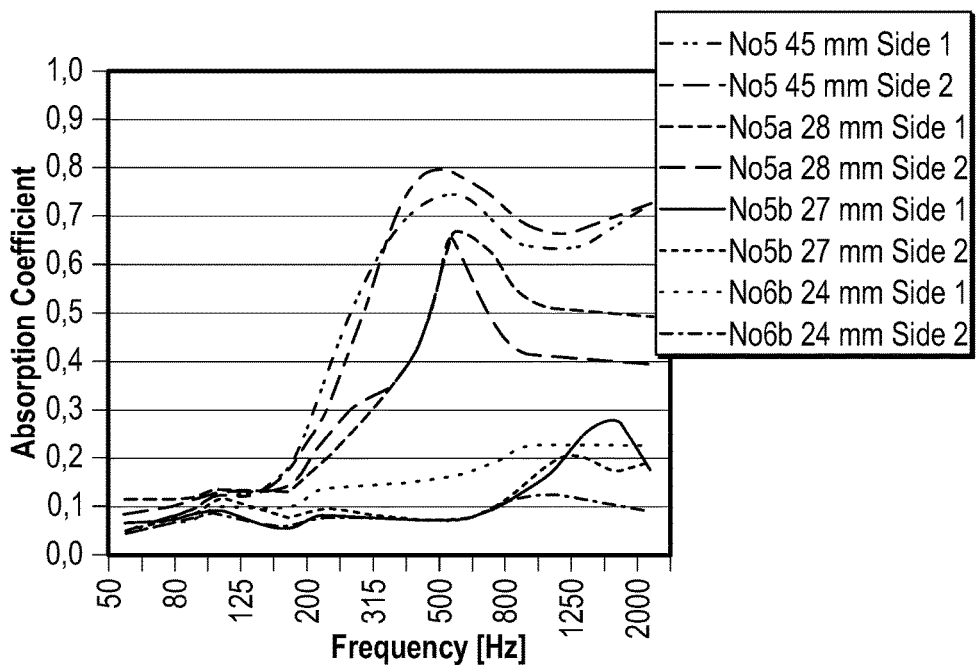
Figure 8:
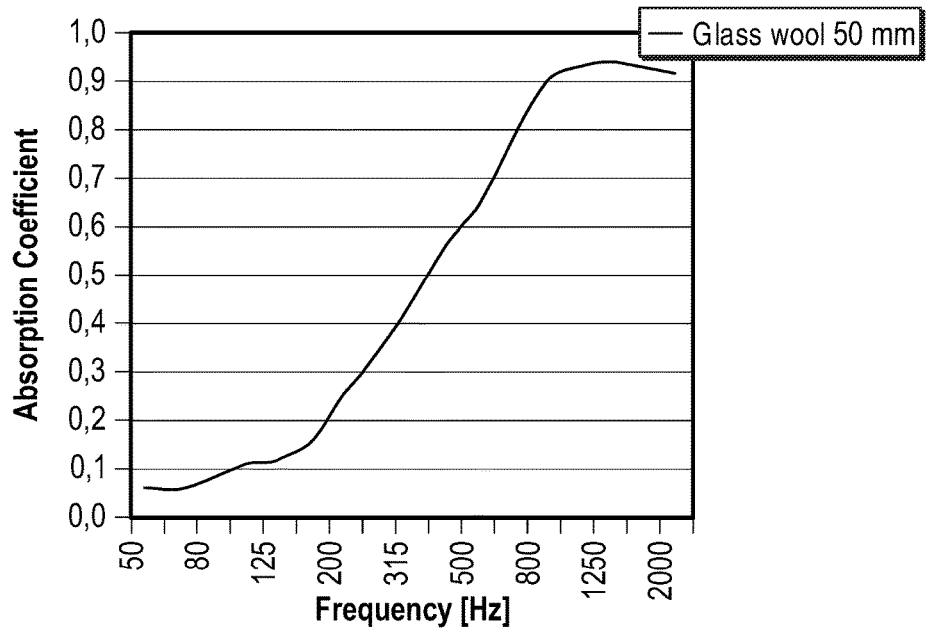

In FIG. 2 is shown a schematic illustration of the measurement setup 20. As illustrated the test piece 22 is placed in one end of a tube 24, which in the opposite end is connected to a sound generator—a speaker 26. The sound is picked up by two microphones 28 and 30, which via an amplifier 32 is connected to a Fast Fourier Transformer 34, which in turn is connected to a computer 36. The computer is connected to a printer 38. The Fast Fourier Transformer 34 is also connected to the speaker 26 via an amplifier 38. Before the measurements of the sound absorption of the test samples are commenced the transfer function for the measurement setup 20 is determined, and the small, but inevitable, phase and amplitude errors in the measurement equipment are minimized by a exchange technique, where the average of two measurements with reversed measurement chains are calculated.

The placement of the test samples within the tube is very critical, because even small cracks and leaks, for example between the test sample and tube, may affect the sound absorption considerably. The leaks between the tube and test samples were minimized by using a special creme as filler between the tube and test sample.

The following measurement equipment was used for the tests:

| Item | Brand | Type no. | DELTA No. |
|---|---|---|---|
| Measurement tube | Brüel & Kjær | — | — |
| Amplifier | DELTA | — | — |
| Microphones | Brüel & Kjær | 4165/4190 | 4213/0694L/1072L |
| Power supply | Brüel & Kjær | 2669 | 1080L/1207L/1215L |
| Calibrator | Brüel & Kjær | 4231 | 118T |
| Spectral analyzer | Brüel & Kjær | PULSE | #2665538 |

By the measurement setup 20, the absorption coefficient is determined with a frequency resolution of 2 Hz in the frequency interval from 50 Hz to 2000 Hz. This frequency interval is determined by the maximal microphone distance and the inner diameter of the tube 24.

In order to provide an estimation of the sound absorption for building purposes, the absorption coefficients have been recalculated to ⅓ octave frequency bands.

Sound absorption of selected samples listed in the table below was conducted using the set up and method described above. The samples used were:

| Sample | Contents | Thickness |
|--------|----------|-----------|
| No 1 | Nonwoven mat comprising fibers from textile waste (lint) from industrial drying machines to which has been added 25% by weight of bicomponent fibers. | 64 |
| No 1a | The mat of sample No 1 which has been pressed during heating (179° C. at 3 minutes) in a manual press (manual flat bed fusing press/manual heat transfer press) to the stated thickness. | 33 |
| No 1b | Four mats of sample No 1 which have been pressed during heating to the stated thickness. | 29 |
| No 2 | Nonwoven mat formed from sheepwool to which has been added 20% by weight of bicomponent fibers. | 75 |
| No 2a | The mat of sample No 2 which has been pressed during heating (179° C. at 3 minutes) in a manual press (Manual flat bed fusing press/manual heat transfer press) to the stated thickness. | 30 |
| No 2b | Four mats of sample No 2 which have been pressed during heating to the stated thickness. | 40 |
| No 3 | Nonwoven mat formed from fibers of black wool to which has been added 25% by weight of bicomponent fibers. | 35 |
| No 3a | The mat of sample No 3 which has been pressed during heating (179° C. at 3 minutes) in a manual press (manual flat bed fusing press/manual heat transfer press) to the stated thickness. | 15 |
| No 3b | Four mats of sample No 3 which have been pressed during heating to the stated thickness. | 23 |
| No 4 | Nonwoven mat formed from mixed fibers (granulated earlier produced mats) to which has been added 25% by weight of bicomponent fibers. | 45 |
| No 4a | The mat of sample No 4 which has been pressed during heating (179° C. at 3 minutes) in a manual press (manual flat bed fusing press/manual heat transfer press) to the stated thickness. | 20 |
| No 4b | Four mats of sample No 4 which have been pressed during heating to the stated thickness. | 32 |
| No 5 | Nonwoven mat formed from fibers from Cotton (Jeans) to which has been added 25% by weight of bicomponent fibers. | 45 |
| No 5a | The mat of sample No 5 which has been pressed during heating (179° C. at 3 minutes) in a manual press (manual flat bed fusing press/manual heat transfer press) to the stated thickness. | 28 |
| No 5b | Four mats of sample No 5 which have been pressed during heating to the stated thickness. | 27 |
| No 6b | Four mats of green wool to which has been added 25% by weight of bicomponent fibers and which have been pressed during heating to the stated thickness. | 24 |

The absorption coefficient for these samples, and for 50 mm glass wool, is shown in FIGS. 3-8.

From the figures the following conclusions may be drawn: Samples No2 and No4 have absorption coefficients which match those of glass wool and may therefore be used as a substitute to glass wool for acoustic insulation or acoustic sheets.

Other samples useful for acoustic sheets placed on walls and ceilings include samples No1, No2, No2a, No3, No4, and No5.

Furthermore there is a need for sound absorbing materials which have a good absorption for low frequencies and which have at least passable absorption in the higher frequencies, i.e. do not reflect so much higher frequency sound so as to worsen the acoustic environment in noisy environments. Suitable samples for these type of absorbents include No1a, No2b and No4b.

For use as a sound insulation in partition walls the samples No1, No2, No2a, No3, No4 and No5 could be useful.

Samples No3a, No4a and No5a could possibly be used as floor underlayment to dampen step sound.

Possibly the samples No1b. No3b, No5b and No6b could be used as sound absorbing sheets on partition walls.

Example 2-1: Further Test Samples

Further tests were made on the following samples, as described in the table below, produced by the method according to the present invention.

| Sample designation | Contents of product | Average fiber length |
|---|---|---|
| Sample 1 | Textile waste (lint) from industrial drying machines to which has been added 25% by weight of bicomponent fibers. | 0.5-4 mm |
| Sample 2 (P2.1KS) | While cotton (from used bed sheets) to which has been added 25% by weight of bicomponent fibers. | Granulated used bed sheets result in fibers having homogenous appearance and an average fiber length of 0.5-4 mm. |
| Sample 3 (P3.1KS) | White cotton (from used bed sheets) to which has been added 25% by weight of bicomponent fiber and 2% by weight of a wetting agent (maleic anhydride polypropylene). | As above. |
| Sample 4 (P4.1KS) | White cotton (from used bed sheets) to which has been added 10% by weight of bicomponent fiber, 2% by weight of wetting agent and 18% by weight of recycled polyethylene | As above. |
| Sample 5 (P5.1KS) | Black wool (from waste woven piece goods) to which has been added 25% by weight of bicomponent fibers. | The granulated waste woven piece goods result in fibers having homogenous appearance and an average fiber length of 0.5-4 mm. |
| Sample 6 (P6.1KS) | Black wool to which has been added 25% by weight of bicomponent fiber and 2% by weight of wetting agent (maleic anhydride polypropylene). | As above. |
| Sample 7 (P7.1KS) | Black wool to which has been added 10% by weight of bicomponent fiber, 2% by weight of wetting agent and 18% by weight of recycled polyethylene. | As above. |

| Sample designation | Contents of product | Average fiber length |
|---|---|---|
| Sample 8 | Brown wool to which has been added 25% by weight of bicomponent-fiber | 0.5-4 mm |
| Sample 9 (P11.1KS) | Fiber mix of 50% white cotton (from used bed sheets) and 50% black wool to which has been added 25% by weight of bicomponent fibers. | 0.5-4 mm |
| Sample 10 (P13.1KS) | Sheep wool from spinning process to which has been added 20% by weight of bicomponent fibers. | Sheep wool has an average fiber length of 2,097 mm yet about 19% of the sheep wool fibers are 4.5-7.5 mm. |
| Sample 11 (P8.1KS) | Fiber mix of 50% sheep wool and 50% black wool to which has been added 20% by weight of bicomponent fibers. | 0.5-4 mm |
| Sample 12 P.18_KS | Mix of 50% Turquoise wool and 50% cork to which has been added 25% by weight of bicomponent fiber. | 0.5-4 mm. The cork was granulated to pieces each having a diameter of 3-10 mm. |
| Sample 13 P.16_KS | Cotton (from jeans textile) to which has been added 25% by weight of bicomponent fiber. | The granulated waste jeans textile resulted in fibers having an average fiber length between 0.5 and 4 mm, specifically 1,134 mm, and a mean width of 21.9 micron. |
| Sample 14 (P.14.1KS) | Mixed fibers (remnants, waste and leftovers from the production of the above samples excluding wool and cork) to which has been added 5% bicomponent fibers | 0.5-4 mm |

The bicomponent fiber used for the above samples is AL-Adhesion-C-1.7 dtex, 6 mm, from ES fibervisions, Engdraget 22 DK-6800 Varde, Denmark. The bicomponent fibers comprise polyethylene and poly propylene with respective soft points of 124 C and 140 C and respective melting points of 130° C. and 162° C.

The recycled polyethylene used for the above samples was PE MD ROTA Black, ID 45796, from Aage Vestergaard Larsen A/S, Klostermarken 3 DK-9550 Mariager, Denmark.

Example 2-2: Effects of Material Composition on Fulfillment of MDF Standards

A number of the above samples, as pressed boards, were tested for swelling, internal bond, bending strength and mean modulus of elasticity for comparison with the standards required of MDF plates, and the results are displayed in the table below:

Sample P8.1KS, comprising the mix of black wool (having short fibers) and sheep wool (having fibers longer than 4 mm, has much higher swelling than the sample P5.1 KS having only short fibers. Thus there is a need for using short fibers and a homogenous distribution, i.e. low spreading, of fiber length.

The table further shows the good properties of wool (samples P5.1KS to P8.1KS) in relation to cotton (samples P2.1KS to P4.1KS) as regards swelling. In fact, all the wool samples fulfil the EN-622-5MDF and the EN-622-5MDF.H (for humid conditions) standard for swelling while none of the cotton samples fulfils the EN-622-5MDF.H standard and only sample P4.1KS of the cotton sample fulfils the EN-622-5MDF standard.

The result for sample P4.1KS further shows that the recycled polyethylene, and thereby presumably also virgin polyethylene, is beneficial to improving swelling properties as the other cotton samples which do not contain recycled polyethylene do not fulfil the requirements of the standard.

The table below further shows results for further samples as pressed boards.

| Board_ID | Thickness (measured) [mm]/COV | | Density [kg/m3]/COV | | Swelling (EN 317 - 24 h) [%]/COV | | Bending strength (MOR) (EN 310) [MPa]/COV | | Modulus of elasticity (MOE) (EN 310) [MPa]/COV | |
|---|---|---|---|---|---|---|---|---|---|---|
| P2.1KS | 9.47 | 0.9 | 994.4 | 1.1 | 22.5 | 0.6 | 40.24 | 8.05 | 3705 | 10 |
| P3.1KS | 11.82 | 0.6 | 1061.3 | 0.5 | 24.6 | 1.4 | 27.67 | 4.7 | 2620 | 11 |
| P4.1KS | 9.4 | 0.7 | 1028.4 | 0.2 | 12.8 | 3.3 | 27.66 | 4.65 | 2687 | 5 |
| P5.1KS | 8.88 | 1.3 | 1194.7 | 0.2 | 1.9 | 0 | 36.75 | 1.13 | 2690 | 0 |
| P6.1KS | 10.14 | 2 | 1161 | 1 | 1.1 | 0 | 36.99 | 6.26 | 2423 | 4 |
| P7.1KS | 9.96 | 1 | 1152.1 | 0.7 | 1.1 | 0 | 29.05 | 4.25 | 1773 | 3 |
| P8.1KS | 9.73 | 8.5 | 1177.2 | 2.3 | 10.6 | 10 | 33.13 | 11.48 | 2014 | 7 |

| Board_ID | Process description | Thickness (measured) [mm]/COV | | Density [kg/m3]/COV | | Swelling (EN 317 - 24 h) [%]/COV | | Internal Bond (EN 319) [MPa]/COV | | Bending Strength (MOR) (EN 310) [MPa]/COV | | Modulus of elasticity MOE (EN 310) [MPa]/COV | |
|---|---|---|---|---|---|---|---|---|---|---|---|---|---|
| P4.1KS/ P10.1KS | White cotton 100% + 2% WA + PE | 7.05 | 0.4 | 1017.9 | 2.8 | 11.3 | 2.3 | 1 | 11.7 | 26.87 | 11.22 | 2595 | 13 |
| P11.1KS | Black wool 50%/50% Cotton | 8.1 | 0.4 | 1059.3 | 1.7 | 13.3 | 3.4 | 0.68 | 9.2 | 29.56 | 8.65 | 2081 | 6 |
| P5.1KS/ P12.1KS | Black 100% wool/ wool | 7.72 | 0.4 | 936.3 | 0.4 | 14.8 | 1 | 0.13 | 8.2 | 17.08 | 31.27 | 1054 | 23 |
| P13.1KS | Sheep wool | 5.9 | 3.2 | 919.5 | 3.2 | 33.5 | 31.6 | Not tested | | 9.91 | 21.58 | 554 | 28 |
| P14.1KS | Mixed fibre | 7.37 | 2.2 | 977 | 7.1 | 4 | 35.4 | 0.94 | 6.9 | 33.7 | 5.43 | 1966 | 4 |

Of the above samples, only P4.1KS, P11.1KS and P14.1KS fulfil the requirements of the swelling, bending strength and internal bond standards for MDF plates. P13.1KS fails all these requirements, while P5.1KS fulfils the requirement for swelling, but not the other two.

The results further show that addition of the recycled polyethylene results in improved internal bond as sample P4.1KS has the highest internal bond.

From sample P11.1KS it can be seen that this sample has improved swelling properties, when compared to the sample P2.1 KS, due to the wool fibres in mixed with the cotton fibres.

Example 2-3: Effects of Material Composition on Hardness

A number of samples, as pressed boards, were tested for hardness according to Shore D (ISO 868), Brinell (EN 1534), and Scratch (SIS 839117), see the results in the table below:

| Board_ID | Matertal | Shore D - mean of 10 points | HB [N/mm$^2$] | Scratch at 3N and 5N |
|---|---|---|---|---|
| P.B-2_KS | Wool + Wool | 61 | 42.02 | Visible scratch when light hits the plate and is reflected |
| P14.1KS/ P.15_KS | Mixed fibre | 73 | 50.99 | Visible scratch when light hits the plate and is reflected |
| P.16_KS | Jeans | 72 | 44.99 | Visible scratch when light hits the plate and is reflected |
| P.17_KS | Sheep wool | 42 | 18.95 | Visible scratch when light hits the plate and is reflected |
| P.18_KS | Turquoise Wool/Kork | 68 | 29.28 | Visible scratch when light hits the plate and is reflected |

As can be seen from the table, the sheep wool has a significantly lower hardness than the other samples due to the presence of longer fibres.

Example 2-4: Ignitability

Fire testing was performed with single test single flame source according to EN ISO 11925-2 for the following samples as pressed boards.

| Sample number | Contents | Thickness (mm) | Density |
|---|---|---|---|
| 1 (corresponds to Sample 5 in example 2-1 excluding lanolin) | 80% wool + 20% bicomponent fibres. Covered with lanolin | 11.2 | 1145 |
| 2 (corresponds to Sample 5 in example 2-1 excluding Burnblock) | 80% wool + 20% bicomponent fibres. Covered with Burnblock® | 7.1 | 1142 |
| 3 (corresponds to Sample 5 in example 2-1) | 80% wool + 20% bicomponent fibres. | 7.2 | 1086 |
| 4 (corresponds to Sample 9 in example 2-1) | Mixed wool and cotton + 20% bicomponent fibres. | 11.1 | 919 |
| 5 (corresponds to Sample 13 in example 2-1) | Cotton(Jeans) + 20% bicomponent fibres. | 8.4 | 1262 |
| 6 (corresponds to Sample 13 in example 2-1 excluding Burnblock) | Cotton (jeans) + 20% bicomponent fibres, coated with Burnblock® | 8.5 | 1066 |

Burnblock® is a fire retardant marketed by BURN-BLOCK ApS. Kgs Nytorv 15, 1050 Copenhagen K, Denmark.

None of the samples ignited during the 30 seconds during which the flame was directed at the edge of the sample. There further were no burning droplets.

Example 2-5: Influence of Fiber Direction on Mechanical Properties

The table below shows the bending strength of various samples as pressed boards having different fiber directions.

| Board_ID | Material | Process description | Control | Thickness (nom.) [mm] | Thickness (measured) [mm]/COV | | MOR (EN 310) [MPa]/COV | | MOE (EN 310) [MPa]/COV | |
|---|---|---|---|---|---|---|---|---|---|---|
| PB3KS | Cotton (Sample 2 in Example 2-1) | Parallel direction | Automatic | 9 | 8.73 | 1.25 | 36.91 | 6.38 | 4123 | 10 |
| PB4KS | Cotton (Sample 2 in Example 2-1) | orthogonal direction | Automatic | 9 | 8.68 | 0.41 | 19.01 | 5.09 | 2126 | 14 |
| PU2KS | Wool (Sample 5 in Example 2-1) | Parallel direction | Automatic | 9 | 8.26 | 0.29 | 22.72 | 8.35 | 1323 | 10 |
| PU3KS | Wool (Sample 5 in Example 2-1) | orthogonal direction | Automatic | 9 | 8.2 | 1.25 | 26.38 | 6.04 | 1515 | 6 |

Of the above samples, PB3KS, PU3KS filfil the EN 310 bending strength requirement for MDF according to the EN 622-5 MDF standard, while only PB3KS fulfils the bending strength required by the EN 622-5 MDF.H standard.

Example 2-6: Effects of Coating Products Produced by the Method According to the Present Invention The following samples, as pressed plates of approximately 8 mm thickness, were tested:

| Sample | Coating | Swelling % thickness after 24 hours |
|---|---|---|
| P2.1KS | Oil | 21.4 |
| P2.1KS | Oil | 21.2 |
| P2.1KS | Wax | 22.2 |
| P2.1KS | Wax | 21.8 |
| P2.1KS | Lacquer | 21.5 |
| P2.1KS | Lacquer | 22.2 |
| P3.1KS | Oil | 22.8 |
| P3.1KS | Oil | 22.6 |
| P3.1KS | Wax | 24.8 |
| P3.1KS | Wax | 24.8 |
| P3.1KS | Lacquer | 23.6 |
| P3.1KS | Lacquer | 23.3 |
| P4.1KS | Oil | 5.7 |
| P4.1KS | Oil | 2.2 |
| P4.1KS | Wax | 12.0 |
| P4.1KS | Wax | 12.6 |
| P4.1KS | Lacquer | 0.1 |
| P4.1KS | Lacquer | 0.1 |
| P5.1KS | Oil | 0.3 |
| P5.1KS | Oil | 0.8 |
| P5.1KS | Wax | 2.4 |
| P5.1KS | Wax | 2.1 |
| P5.1KS | Lacquer | 0.0 |
| P5.1KS | Lacquer | 0.2 |
| P6.1KS | Oil | 0.1 |
| P6.1KS | Oil | 0.0 |
| P6.1KS | Wax | 1.2 |
| P6.1KS | Wax | 1.6 |
| P6.1KS | Lacquer | 0.0 |
| P6.1KS | Lacquer | −0.1 |
| P7.1KS | Oil | 0.3 |
| P7.1KS | Oil | 0.4 |
| P7.1KS | Wax | 1.2 |
| P7.1KS | Wax | 1.3 |
| P7.1KS | Lacquer | 0.0 |
| P7.1KS | Lacquer | −0.1 |

The wax used was "Nordin Voks" from Farvefabrikken Skovgaard & Frydensberg Gadestævnet 6-8, 2650 Hvidovre, Denmark.

The oil used was "Junckers Rustik BordpladeOlie klar" a hardening urethane oil from Junckers Industrier A/S, Værftsvej 4, 4600 Køge, Denmark.

The lacquer used was Plastofix 96RF 52156, which is a 2 component acid hardening lacquer comprising alkyde, melamin resin and cellulose nitrate from Akzo Nobel, Holmbladsgade 70, DK2300 Copenhagen S, Denmark.

As can be seen from the table above, samples P2.1KS and P3.1KS have equally high swelling regardless of coating method, while sample P4.1KS generally obtains lower swelling, and in particular a good low result is seen if coated by lacquer.

In contrast to the cotton samples, i.e. P2.1KS-P4.1KS, the wool samples, i.e. P5.1KS-P7.1KS, provide much lower swelling, especially if coated with lacquer.

Example 2-7: $1^{st}$ and $2^{nd}$ Generation Products

Test were carried out where a product produced by the method according to the present invention was used as textile waste for producing a new product, i.e. a $1^{st}$ generation product (closed loop#1), and where this $1^{st}$ generation product was used to make a new $2^{nd}$ generation product (closed loop#2).

| Board_ID | Material | Process description | Thickness (measured) [mm]/COV | | Bending strength (MOR) (EN 310) [MPa]/COV | | Modulus of elasticity (MOE) (EN 310) [MPa]/COV | |
|---|---|---|---|---|---|---|---|---|
| B.1 | Cotton (Sample 2 in Example 2-1) | 170° C. STD PRG. | 8.84 | 0.7 | 36.58 | 12.23 | 4067 | 11 |
| P9.8KS | Wool (Sample 5 in Example 2-1) | 170° C. STD PRG. | 8.15 | 0.3 | 47.21 | 7.38 | 2464 | 11.1 |
| P37.3 KS | Wool (Sample 5 in Example 2-1) | Closed loop #1 | 9.9 | — | 49.47 | — | 2633 | — |
| P40 KS | Wool (Sample 5 in Example 2-1) | Closed loop #2 | 8.5 | — | 38.48 | — | 2647 | — |
| P38.3 KS | Cotton (Sample 2 in Example 2-1) | Closed loop #1 | 10.3 | — | 11.8 | — | 1588 | — |
| P41 KS | Cotton (Sample 2 in Example 2-1) | Closed loop #2 | 8.5 | — | 23.31 | — | 3399 | — |
| P39.3 KS | Cotton + Wool (Sample 9 in Example 2-1) | Closed loop #1 | 9.7 | — | 18.15 | — | 1743 | — |
| P42 KS | Cotton + Wool (Sample 9 in Example 2-1) | Closed loop #2 | 9.8 | — | 37.15 | — | 3226 | — |

The samples B.1 and P9.8KS are included for reference.

As can be seen from the table, the $2^{nd}$ generation wool product sample P40 KS has a somewhat lower bending strength than the first generation wool sample P37.3KS. For cotton however the bending strength actually increases between the first generation sample P 38.3 KS and the second generation sample P41 KS. An increase in bending strength is also seen between the $1^{st}$ generation cotton+wool sample P39.3 KS and the $2^{nd}$ generation cotton+wool sample.

Example 2-8: Addition of 3% Glass Fibres

Tests were carried out for measuring bending strength dependent on the addition of 3% glass fibres for samples as pressed boards. The results are shown in the table below (samples B.1 and P9.8KS serving as reference:

| Board_ID | Material | Process description | Thickness (measured) [mm]/COV | | Bending strength (MOR) (EN 310) [MPa]/COV | | Modulus of elasticity (MOE) (EN 310) [MPa]/COV | |
|---|---|---|---|---|---|---|---|---|
| B.1 | Cotton (Sample 2 in Example 2-1) | 170° C. STD PRG. | 8.84 | 0.7 | 36.58 | 12.23 | 4067 | 11 |
| P9.8KS | Wool (Sample 2 in Example 2-1) | 170° C. STD PRG. | 8.15 | 0.3 | 47.21 | 7.38 | 2464 | 11.1 |
| P45 KS | Black and brown wool (50/50 mix of samples 5 and 8 in Example 2-1) | Without glass fibre | 9 | 0.1 | 29.41 | 30 | 1822 | 24 |

-continued

| Board_ID | Material | Process description | Thickness (measured) [mm]/COV | | Bending strength (MOR) (EN 310) [MPa]/COV | | Modulus of elasticity (MOE) (EN 310) [MPa]/COV | |
|---|---|---|---|---|---|---|---|---|
| P46 KS | Black and brown wool (50/50 mix of samples 5 and 8 in Example 2-1) | With glass fibre | 8.8 | 0.9 | 36.53 | 19 | 2113 | 9 |
| P47 KS | Cotton (Sample 2 in Example 2-1) | Without glass fibre | 9.0 | 0.5 | 24.93 | 12 | 2468 | 17 |
| P48 KS | Cotton (Sample 2 in Example 2-1) | With glass fibre | 9.65 | 0.7 | 28.94 | 25 | 2644 | 16 |

The glass fibre reinforcement used in the above samples was the "UNIFORM GYPSUM Wet Used Chopped Strands" from UCOMPOSITES A/S, Bakkedraget 5 4793 Bogø, Denmark. The diameter of the filaments was 17 micron and the length was 6.3 mm (¼").

As can be seen from the table, the samples with added glass fibre have slightly higher bending strength. Of the samples P45 KS-P48 KS, all except P47 KS fulfil the requirements for binding strength of the EN 622-5 MDF standard.

Example 2-9: Multiple Layer Sandwich

A single sample made up of 10 layers from 5 different sources of textile waste, the layers being from one side to the other: Black wool—Mixed—Cotton (Jeans)—Brown wool—Cotton (white)—Brown wool—Cotton (white)—Cotton (Jeans)—Mixed—Black wool.

The table below shows the test results for this sample:

| Board_ID | Material | Thickness (measured) [mm]/COV | | Density [kg/m3]/COV | | Swelling (EN 317 - 24 h) [%]/COV | | Internal Bond (EN 319) [MPa]/COV | | Bending strength (MOR) (EN 310) [MPa]/COV | | Modulus of elasticity (MOE) (EN 310) [MPa]/COV | |
|---|---|---|---|---|---|---|---|---|---|---|---|---|---|
| P23.1 KS | Mixed materials as above | 18.35 | 0.1 | 1142.9 | 0.6 | 17.3 | 4.1 | 0.25 | 19.7 | 36.95 | 7.05 | 2411 | 21 |

This sample fulfilled the requirement for bending strength for the EN 622-5 MDF standard, but not the requirements for swelling and internal bond.

Example 2.10: Different Press and Heating Programmes

The table below details samples pressed to a nominal thickness of 9 mm in a standard pressing program at 170° C. defined by FIGS. 11 (B.1 Cotton) and 12 (P9.8KS Wool).

| Board_ID | Material | Thickness (measured) [mm]/COV | | Density [kg/m3]/COV | | Swelling (EN 317 - 24 h) [%]/COV | | Internal Bond (EN 319) [MPa]/COV | | Bending strength (MOR) (EN 310) [MPa]/COV | | Modulus of elasticity (MOE) (EN 310) [MPa]/COV | |
|---|---|---|---|---|---|---|---|---|---|---|---|---|---|
| B.1 | Cotton (Sample 2 in Example 2-1) | 8.84 | 0.7 | 1024.8 | 0.4 | 24.2 | 0.2 | 0.39 | 3.1 | 36.58 | 12.23 | 4067 | 11 |
| P9.8KS | Wool (Sample 5 in Example 2-1) | 8.15 | 0.3 | 1039.3 | 1.9 | 1.7 | 20.4 | 0.77 | 17.6 | 47.21 | 7.38 | 2464 | 11.1 |

Figure 11:
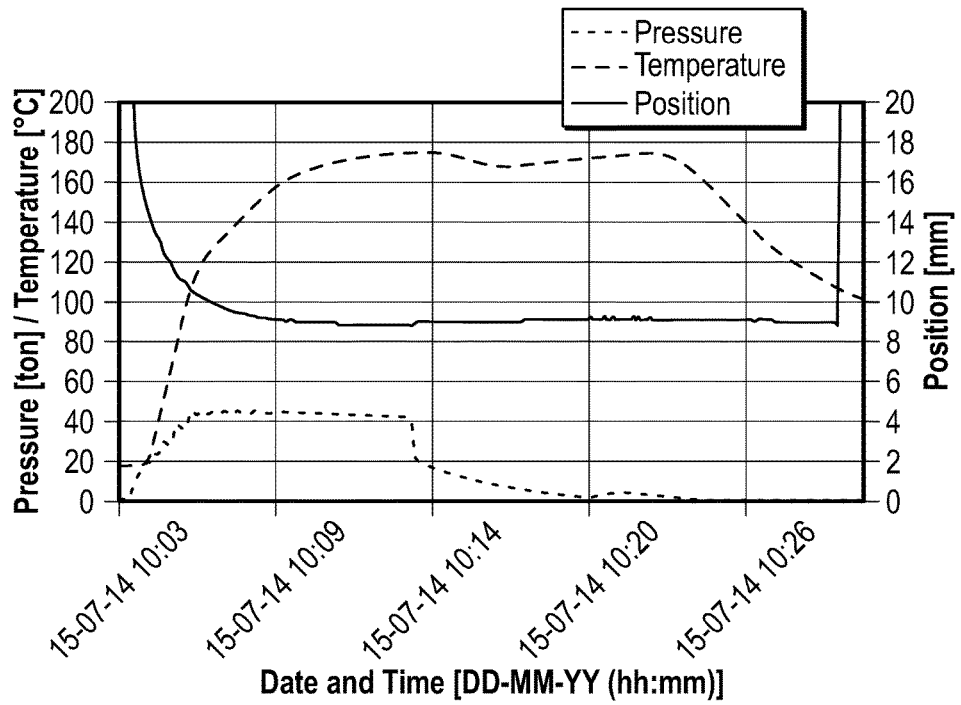
FIG. 11-18 show pressure—temperature—position of different pressure programs.

As can be seen from FIG. 11, the initial thickness of the nonwoven mat comprising cotton textile waste before pressing was about 20 mm, and the final thickness was 9 mm. The pressing time was about 28 minutes. In the FIGS. 11-18 the temperature is the temperature measured in the middle of each sample during pressing. Further, in FIGS. 11-18, the position shown in the figures is the position of the moving pressure plate of the flat press used, this position being the same as the thickness of the sample.

Figure 12:
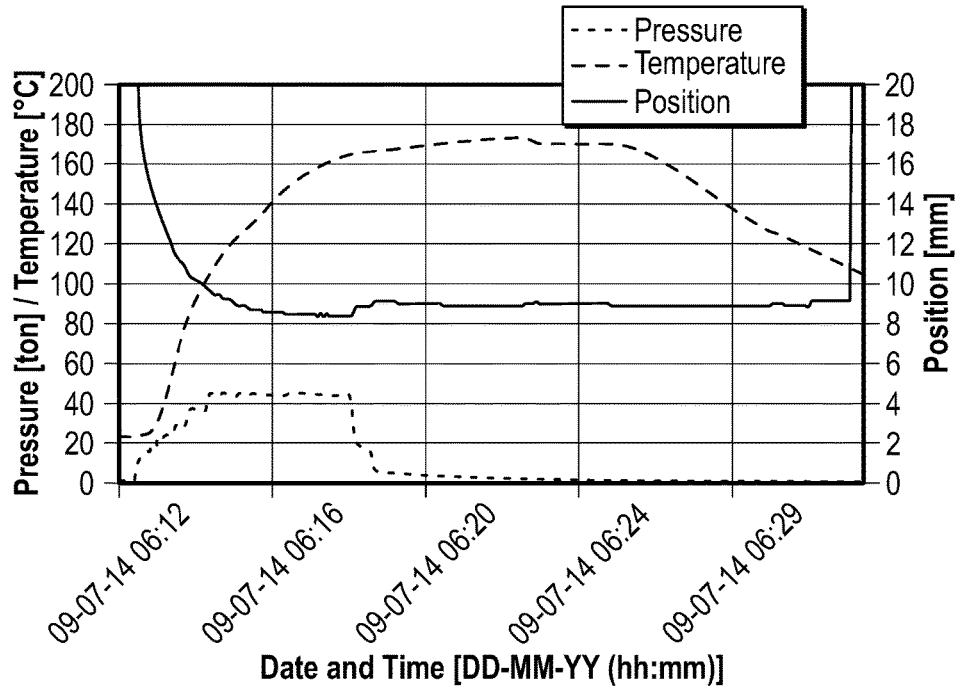
Figure 13:
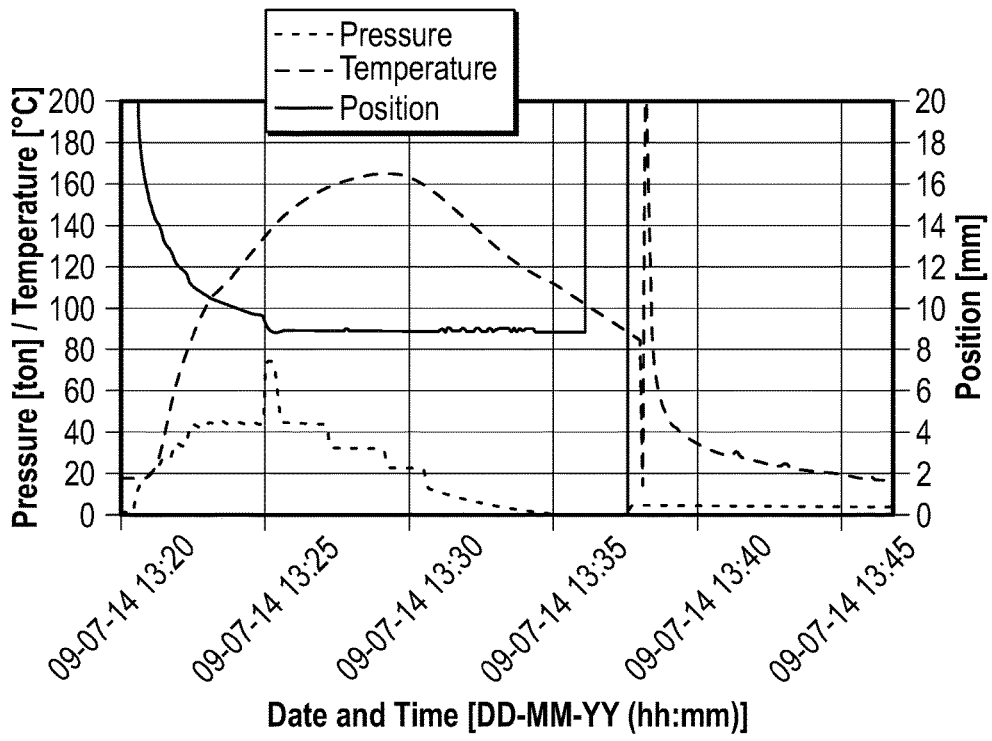
Figure 14:
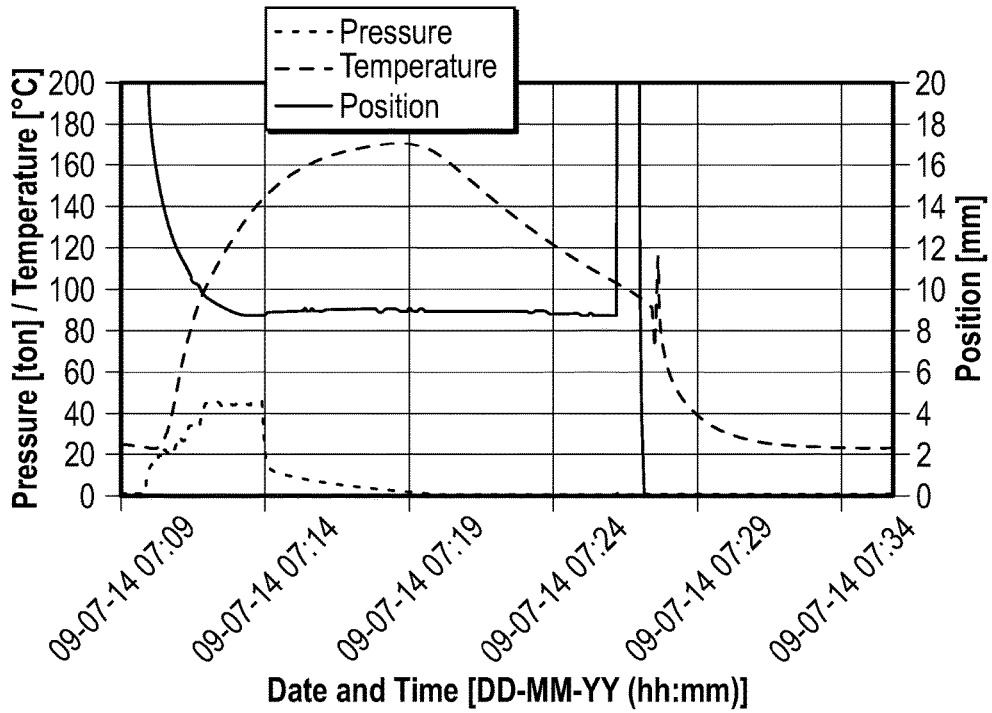
Figure 15:
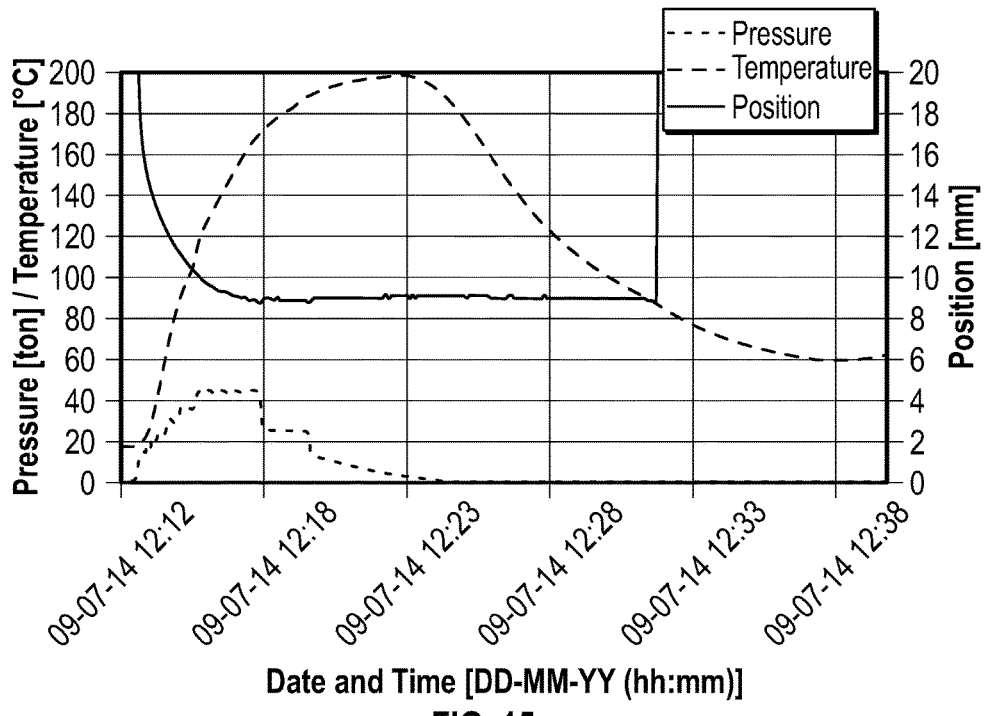
Figure 16:
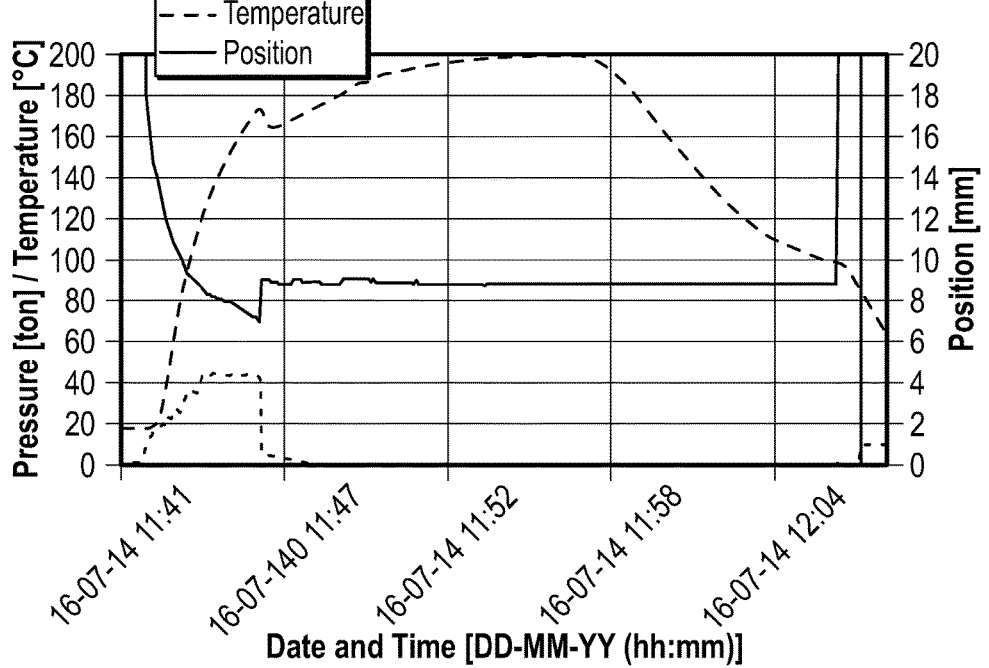
Figure 17:
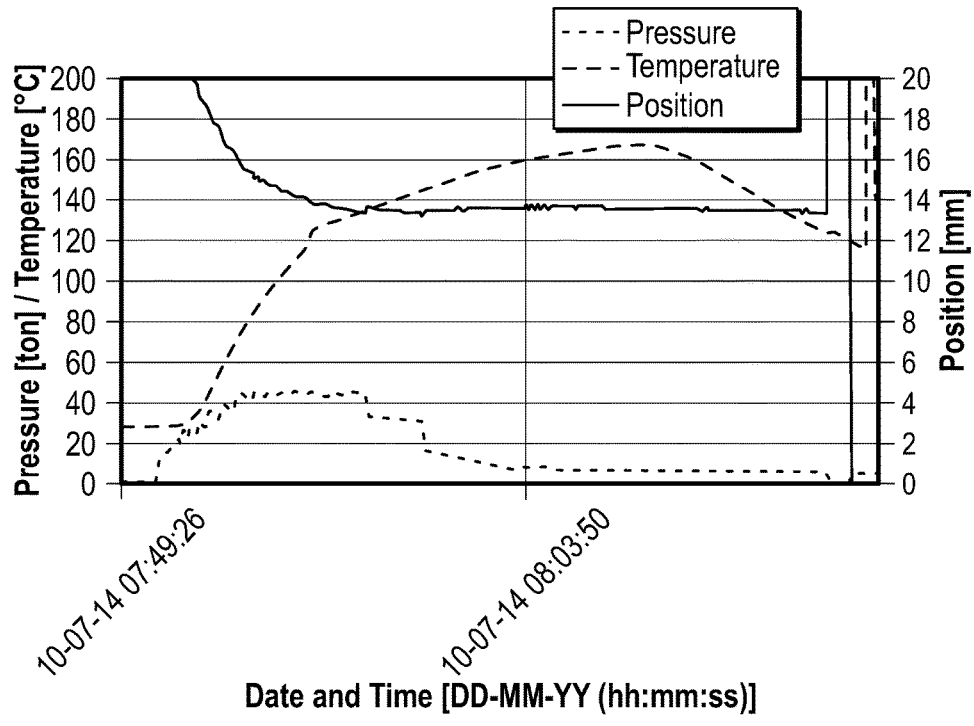
Figure 18:
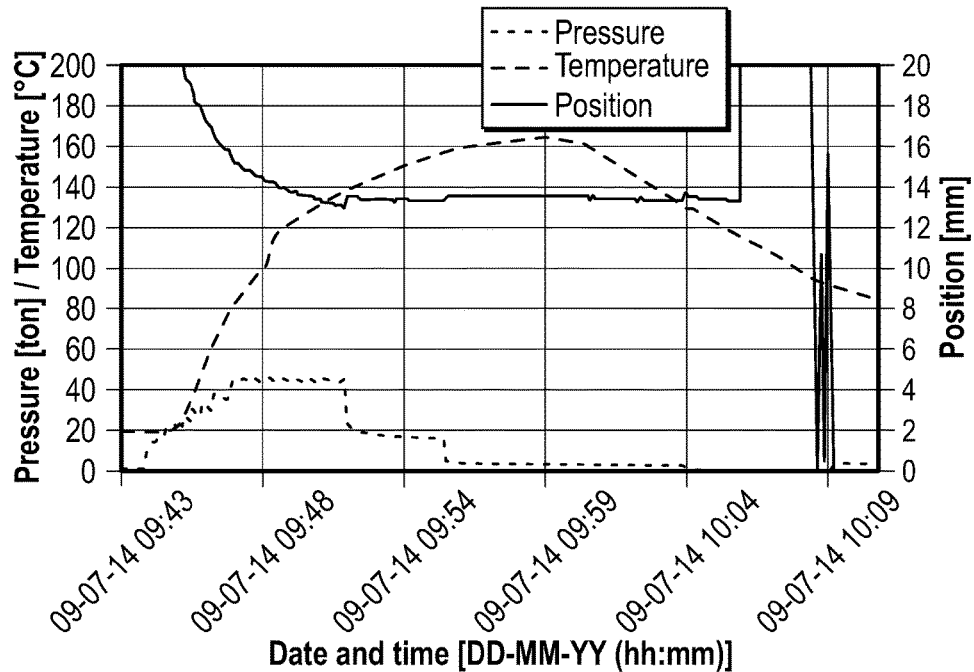

As can be seen from FIG. 12, the initial thickness of the nonwoven mat comprising wool textile waste before pressing was about 20 mm and the final thickness was 9 mm. The pressing time was about 22 minutes.

The table below details samples pressed to a nominal thickness of 9 mm in a quick pressing program at 170° C. aimed at pressing at twice the speed of the standard program. The quick program is defined by FIGS. 13 (P9.3KS Cotton) and 14 (P9.7KS Wool).

| Board_ID | Material | Thickness (measured) [mm]/COV | | Density [kg/m3]/COV | | Swelling (EN 317 - 24 h) [%]/COV | | Internal Bond (EN 319) [MPa]/COV | | Bending Strength (MOR) (EN 310) [MPa]/COV | | Modulus of elasticity (MOE) (EN 310) [MPa]/COV | |
|---|---|---|---|---|---|---|---|---|---|---|---|---|---|
| P9.3 KS | Cotton (Sample 2 in Example 2-1) | 9.17 | 0.4 | 1104.4 | 0.4 | 26.6 | 2.8 | 0.43 | 8.7 | 30.55 | 8.64 | 3691 | 8 |
| B.1 | Cotton (Sample 2 in Example 2-1) | 8.84 | 0.7 | 1024.8 | 0.4 | 24.2 | 0.2 | 0.39 | 3.1 | 36.58 | 12.23 | 4067 | 11 |
| P9.7 KS | Wool (Sample 5 in Example 2-1) | 8.31 | 0.3 | 1114.3 | 2.1 | 2.9 | 15.4 | 0.73 | 34.7 | 42.49 | 8.97 | 2553 | 8 |
| P9.8 KS | Wool (Sample 5 in Example 2-1) | 8.15 | 0.3 | 1039.3 | 1.9 | 1.7 | 20.4 | 0.77 | 17.6 | 47.21 | 7.38 | 2464 | 11.1 |

In the above table samples, B.1 and P9.8KS at standard temperature and pressing time have been included for reference.

The table below details samples pressed to a nominal thickness of 9 mm at a temperature of 200° C. and at half the time of the standard program. The program is defined by FIGS. 15 (P9.2KS Cotton) and 16 (A1.1 Wool).

| Board_ID | Material | Thickness (measured) [mm]/COV | | Density [kg/m3]/COV | | Swelling (EN 317 - 24 h) [%]/COV | | Internal Bond (EN 319) [MPa]/COV | | Bending strength (MOR) (EN 310) [MPa]/COV | | Modulus of elasticity (MOE) (EN 310) [MPa]/COV | |
|---|---|---|---|---|---|---|---|---|---|---|---|---|---|
| B.1 | Cotton (Sample 2 in Example 2-1) | 8.84 | 0.7 | 1024.8 | 0.4 | 24.2 | 0.2 | 0.39 | 3.1 | 36.58 | 12.23 | 4067 | 11 |
| P9.2 KS | Cotton (Sample 2 in Example 2-1) | 9.05 | 0.2 | 1125.5 | 1.3 | 19 | 11.1 | 0.51 | 4.4 | 37.74 | 6.21 | 3997 | 7 |
| P9.8 KS | Wool (Sample 5 in Example 2-1) | 8.15 | 0.3 | 1039.3 | 1.9 | 1.7 | 20.4 | 0.77 | 17.6 | 47.21 | 7.38 | 2464 | 11.1 |
| A1.1 | Wool (Sample 5 in Example 2-1) | 8.34 | 0.8 | 963.3 | 0.9 | 4 | 6.3 | 0.71 | 32.3 | 41.97 | 11.01 | 1903 | 12 |

In the above table, samples B.1 and P9.8KS at standard temperature and pressing time have been included for reference.

The table below details three mats pressed to plates with a nominal thickness of 13.5 mm in a standard program at 170° C. The standard program is defined by FIGS. 17 (P9.4KS Cotton) and 18 (P9.6KS).

| Board_ID | Material | Thickness (measured) [mm]/COV | | Density [kg/m3]/COV | | Swelling (EN 317 - 24 h) [%]/COV | | Internal Bond (EN 319) [MPa]/COV | | Bending strength (MOR) (EN 310) [MPa]/COV | | Modulus of elasticity (MOE) (EN 310) [MPa]/COV | |
|---|---|---|---|---|---|---|---|---|---|---|---|---|---|
| P9.4 KS | Cotton (3 mats of Sample 2 in Example 2-1) | 15.73 | 1.5 | 971.9 | 0.5 | 28.4 | 3 | 0.27 | 2.6 | 23.29 | 2.08 | 2786 | 3 |
| B.1 | Cotton (Sample 2 in Example 2-1) | 8.84 | 0.7 | 1024.8 | 0.4 | 24.2 | 0.2 | 0.39 | 3.1 | 36.58 | 12.23 | 4067 | 11 |
| P9.6 KS | Wool (3 mats of Sample 6 in Example 2-1) | 13.99 | 0.7 | 926.6 | 0.5 | Not tested | Not tested | 0.18 | 38 | Not tested | Not tested | Not tested | Not tested |
| P9.8 KS | Wool (Sample 5 in Example 2-1) | 8.15 | 0.3 | 1039.3 | 1.9 | 1.7 | 20.4 | 0.77 | 17.6 | 47.21 | 7.38 | 2464 | 11.1 |

In the above table, samples B.1 and P9.8KS pressed to a nominal thickness of 9 mm at standard temperature and pressing time have been included for reference.

From the figures it can be seen that the time during which the temperature in the middle if the samples is above 160° C. is longer for cotton than wool.

However, the wool plate has better properties.

Running the pressing at half the time results in a shorter time during which the middle of the sample is above 160 C. However, the samples produced using half the time are good enough.

Running a high temperature program increases the properties for the sample comprising cotton, while it slightly decreases the properties for the sample comprising wool.

When running samples comprises several layers, additional time and/or higher temperatures are needed if the temperature in the middle of the samples is to be maintained above 160 C for sufficient amount of time.

LIST OF REFERENCE NUMBERS

In the following is given a list of reference numbers that are used in the detailed description of the invention.
2 flow diagram of a method according to the invention,
4 method step of collecting textile waste,
6 method step of cutting textile waste into pieces,
8 method step of granulating the textile waste,
10 method step of mixing textile fibers and binder,
12 method step of forming a nonwoven mat,
14 method step of placing the nonwoven mat in a three-dimensional mould or flat press,
16 method step of pressing the nonwoven mat in the three-dimensional mould or flat press.
18 method step of cutting or grinding off excess material of the finished product,
20 measurement setup,
22 test sample,
24 measurement tube,
26 speaker,
28, 30 microphones,
32, 38 amplifier.
34 Fast Fourier Transformer,
36 computer, and
38 printer.
40 Base mat
42 first portion
44 second portion
46 third portion
48f fourth portion
50 fifth portion
52 sixth portion
54 seventh portion
56 eight portion
60 acoustic sheet
62 hard layer
64 soft sound absorbing layer

The invention claimed is:
1. A method of manufacturing a product from textile waste comprising at least 70% of vegetable or animal fibres, the method comprising the steps of:
collecting said textile waste,
granulating said textile waste into fibers having an average fiber length of between 0.5 mm and 4 mm,
mixing said granulated textile waste with a thermoplastic binder, and
forming a nonwoven mat from the mixture of said granulated textile waste and binder by forming a plurality of nonwoven mats from said mixture of said granulated textile waste and binder, and arranging said plurality of nonwoven mats on top of each other to form said nonwoven mat, wherein said collected textile waste comprises woven or knitted textile waste selected from the group consisting of: trimmings, end pieces, faulty sections, experimental pieces and rejected pieces from the textile industry, used textiles, used clothes, used bed linens, or used curtains, and wherein the step of granulating the textile waste comprises the substep of processing said textile waste using a fine granulator.

2. The method according to claim 1, further comprising the steps of:
placing said nonwoven mat in a preheated three-dimensional mould or a flat press, and
pressing said nonwoven mat into a product having a shape determined by the shape of said three-dimensional mould or the flat press.

3. The method according to claim 1, wherein the collected textile waste comprises at least a piece of the manufactured non-woven mat.

4. The method according to claim 1, wherein:
the step of collecting said textile waste comprises the substep of:
collecting a plurality of different types of textile waste,
the step of granulating said textile waste comprises the substep of:
granulating each of said plurality of different types of textile waste, and
the step of mixing said granulated textile waste comprises the substep of:
mixing each of said types of granulated textile waste with a thermoplastic binder, and wherein at least two of said plurality of nonwoven mats are formed from different types of granulated textile waste mixed with said thermoplastic binder.

5. The method according to claim 1, wherein at least one of said plurality of nonwoven mats is pressed separately before being arranged with the other mats of said plurality of nonwoven mats.

6. The method according to claim 2, wherein:
the step of collecting said textile waste comprises the substep of:
collecting a plurality of different types of textile waste having different appearances,
the step of granulating said textile waste comprises the substep of:
granulating each of said plurality of different types of textile waste,
the step of mixing said granulated textile waste comprises the substep of:
mixing each of said types of granulated textile waste with a thermoplastic binder,
and wherein the step of forming said nonwoven mat comprises the substeps of:
forming a nonwoven mat from each of the types of granulated textile waste mixed with said thermoplastic binder,
arranging portions of said nonwoven mats edge to edge for forming said nonwoven mat having a pattern defined by said portions,
and wherein the method further comprises the step of:
forcing said portions of said nonwoven mats together edge to edge during said pressing of said nonwoven mat.

7. The method according to claim 1, wherein said textile waste comprises a mix of wool and cotton, a mix of different wools, and/or a mix of different cottons.

8. The method according to claim 1, wherein:
the step of collecting said textile waste comprises the substeps of:
collecting a first amount of textile waste comprising a majority of cotton, and
collecting a second amount of textile waste comprising a majority of wool,
and:
the step of granulating said textile waste comprises the substeps of:
granulating each of said first and second amounts of textile waste into fibers having an average fiber length of between 0.5 mm and 4 mm, and
mixing said first and second amounts of granulated textile waste.

9. The method according to claim 1, further comprising the step of:
mixing said granulated textile waste with a wetting agent.

10. The method according to claim 9, wherein the wetting agent is maleic anhydride polypropylene.

11. The method according to claim 1, further comprising the step of:
mixing said granulated textile waste with glass fibres.

12. The method according to claim 1, wherein 50% to 90% of said thermoplastic binder is made up of a recycled polyethylene plastic.

13. The method according to claim 1, further comprising the step of cutting the collected textile waste into pieces having a maximal length of 30 cm and a maximal width of 30 cm before commencing the step of granulating said textile waste.

14. The method according to claim 1, wherein the granulated textile fibers have an average length of between 0.5 mm and 3 mm.

15. The method according to claim 14, wherein the granulated textile fibers have an average length of between 0.5 mm and 2 mm.

16. The method according to claim 1, wherein the step of mixing the textile fibers with the binder comprises the substep of mixing said textile fibers and the binder in a ratio such that the binder will constitute between 10% and 30% weight of the finished mixture.

17. The method according to claim 1, wherein the binder comprises fibers of thermoplastics.

18. The method according to claim 17, wherein the fibers of thermoplastics have an average length between 1 mm and 15 mm.

19. The method according to claim 18, wherein the fibers of thermoplastics have an average length between 3 mm and 12 mm.

20. The method according to claim 17, wherein the fibers of thermoplastics are at least in part manufactured from reused plastics.

21. The method according to claim 17, wherein the fibers of thermoplastics are manufactured from renewable natural recourses.

22. The method according to claim 17, wherein the fibers of thermoplastics are manufactured from biodegradable plastics.

23. The method according to claim 17, wherein each of the plastic fibers comprises a mix of biodegradable plastics and conventional plastics.

24. The method according to claim 23, wherein said mix of biodegradable plastics and conventional plastics is a mix, where the biodegradable plastics constitutes at least 70% per weight of said mix.

25. The method according to claim 17, wherein the plastic fibers comprise a mix of fibers made from biodegradable plastics and fibers made from conventional plastics.

26. The method according to claim 24, wherein said mix comprises at least 70% per weight of fibers made from biodegradable plastics and the remainder being fibers made from conventional plastics.

27. The method according to claim 17, wherein each of the plastic fibers comprises a core formed by a first type of plastic and a cladding surrounding the core, which cladding is formed by a second type of plastic, said first type of plastic having a significantly higher melting point than said second type of plastic.

28. The method according to claim 27, wherein the first type of plastic has a melting point which is between 30 degrees Celsius and 80 degrees Celsius higher than the melting point of the second type of plastic.

29. The method according to claim 28, wherein the first type of plastic has a melting point which is between 50 degrees Celsius and 70 degrees Celsius higher than the melting point of the second type of plastic.

30. The method according to claim 27, wherein the first type of plastic has a melting point of between 100 degrees Celsius and 140 degrees Celsius.

31. The method according to claim 27, wherein the second type of plastic has a melting point of between 150 degrees Celsius and 200 degrees Celsius.

32. The method according to claim 1, wherein the step of forming the nonwoven mat from the mixture of said granulated textile waste and binder comprises a substep of heating said mixture to a temperature of between 100 degrees Celsius and 140 degrees Celsius.

33. The method according to claim 2, said pressing being performed at a temperature between 160 to 200° C. at a pressure of 40-100 ton/m$^2$ for 5-15 minutes.

34. The method according to claim 32, further comprising the substep of dry forming the mats by blowing the mix of fibers and binder into a forming head disposed above a forming wire prior to or simultaneously to heating said mixture.

35. The method according to claim 34, further comprising the substep of blowing said mixture of fibers and binder into a forming head placed above a vacuum box disposed on the forming wire where the mixture of fibers and binder is deposited and held by a vacuum.

36. The method according to claim 1, said nonwoven mat being forming using air laying.

37. The method according to claim 1, wherein said preheated three-dimensional mould or flat press comprises first and second complimentary shaped mould or press parts for defining said shape.

38. A method of manufacturing a product from textile waste comprising at least 70% of vegetable or animal fibres, the method comprising the steps of:
collecting said textile waste, wherein said collected textile waste comprises woven or knitted textile waste selected from the group consisting of trimmings, end pieces, faulty sections, experimental pieces and rejected pieces from the textile industry, used textiles, used clothes, used bed linens, and used curtains,
granulating said textile waste into fibers having an average fiber length of between 0.5 mm and 4 mm by processing said textile waste using a fine granulator,
mixing said granulated textile waste with a thermoplastic binder,
forming a nonwoven mat from the mixture of said granulated textile waste and binder,
placing said nonwoven mat in a preheated three-dimensional mould or a flat press,
pressing said nonwoven mat into a product having a shape determined by the shape of said three-dimensional mould or the flat press, and
positioning a plastic film between said mat and said three-dimensional mould or flat press prior to said pressing.

39. A method of manufacturing a product from textile waste comprising at least 70% of vegetable or animal fibres, the method comprising the steps of:
collecting said textile waste, wherein said collected textile waste comprises woven or knitted textile waste selected from the group consisting of trimmings, end pieces, faulty sections, experimental pieces and rejected pieces from the textile industry, used textiles, used clothes, used bed linens, and used curtains,
granulating said textile waste into fibers having an average fiber length of between 0.5 mm and 4 mm by processing said textile waste using a fine granulator,
mixing said granulated textile waste with a thermoplastic binder,
forming a nonwoven mat from the mixture of said granulated textile waste and binder, and
coating said product with a wax, oil or lacquer.

40. A method of manufacturing a product from textile waste comprising at least 70% of vegetable or animal fibres, the method comprising the steps of:
collecting said textile waste, wherein said collected textile waste comprises woven or knitted textile waste selected from the group consisting of trimmings, end pieces, faulty sections, experimental pieces and rejected pieces from the textile industry, used textiles, used clothes, used bed linens, and used curtains,
granulating said textile waste into fibers having an average fiber length of between 0.5 mm and 4 mm by processing said textile waste using a fine granulator,
mixing said granulated textile waste with a thermoplastic binder,
forming a nonwoven mat from the mixture of said granulated textile waste and binder, and
affixing a print, optionally through silk screen printing, to said product.

* * * * *